(12) United States Patent
Sano

(10) Patent No.: US 9,177,180 B2
(45) Date of Patent: Nov. 3, 2015

(54) RF TAG READER AND RF TAG INFORMATION ACQUISITION METHOD

(75) Inventor: Kouichi Sano, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 660 days.

(21) Appl. No.: 13/025,561

(22) Filed: Feb. 11, 2011

(65) Prior Publication Data

US 2011/0199190 A1    Aug. 18, 2011

(30) Foreign Application Priority Data

Feb. 12, 2010  (JP) .................................. 2010-29451

(51) Int. Cl.
*H04Q 5/22* (2006.01)
*G08C 19/16* (2006.01)
*G05B 11/01* (2006.01)
*G06K 7/10* (2006.01)

(52) U.S. Cl.
CPC ........ *G06K 7/10019* (2013.01); *G06K 7/10029* (2013.01); *G06K 7/10039* (2013.01)

(58) Field of Classification Search
CPC ............. G08B 13/1965; G06K 7/0008; G06K 17/0029; G06K 2017/0048; G06K 7/10108
USPC ................................................ 340/10.1–10.6
See application file for complete search history.

(56) References Cited

U.S. PATENT DOCUMENTS

| | | | | |
|---|---|---|---|---|
| 6,496,806 | B1 * | 12/2002 | Horwitz et al. ................. | 705/28 |
| 7,088,229 | B2 * | 8/2006 | Johnson ......................... | 340/505 |
| 7,588,185 | B2 * | 9/2009 | Berquist et al. ............... | 235/385 |
| 2007/0273530 | A1 * | 11/2007 | Koezuka et al. ............. | 340/572.7 |
| 2008/0042830 | A1 * | 2/2008 | Chakraborty et al. ........ | 340/540 |
| 2008/0278294 | A1 * | 11/2008 | Konuma .................... | 340/10.41 |
| 2009/0251294 | A1 * | 10/2009 | Kawamura et al. ........ | 340/10.51 |
| 2010/0019905 | A1 * | 1/2010 | Boddie et al. .............. | 340/572.1 |
| 2010/0045444 | A1 * | 2/2010 | Weiss Ferreira Chaves et al. .......................... | 340/10.42 |
| 2010/0148933 | A1 * | 6/2010 | Dacus .......................... | 340/10.3 |
| 2010/0171595 | A1 * | 7/2010 | Fujino et al. ................. | 340/10.2 |
| 2012/0318866 | A1 * | 12/2012 | McIntyre ...................... | 235/385 |

FOREIGN PATENT DOCUMENTS

| | | |
|---|---|---|
| JP | 3131170 | 4/2007 |
| JP | 2009-087049 | 4/2009 |

OTHER PUBLICATIONS

Author: Scot Rosenthal, Title: Interrupts might seem basic, but many programmers still avoid them, Published Date: May 1995, Publisher: http://www.sltf.com, Pertinent: Pages: Entire Document.*

Author: Intel, Ttile: Intel 64 and IA 32 Architecures Software Developers Manual, Publisher: Intel, Pertinent Pages: Chapter 6.*

* cited by examiner

*Primary Examiner* — Vernal Brown
*Assistant Examiner* — Muhammad Adnan
(74) *Attorney, Agent, or Firm* — Amin, Turocy & Watson, LLP

(57) ABSTRACT

There is provided an RF tag reader including an omission-in-reading determining section which determines that an RF tag belonging to a predetermined group might be unread when tag information is not acquired from an RF tag, which belongs to the group and whose tag information is not acquired yet, within a predetermined time after tag information corresponding to any one of a plurality of RF tags grouped as the predetermined group is acquired.

11 Claims, 24 Drawing Sheets

FIG.7

```
                    OMISSION-IN-READING
                    POSSIBILITY STATE DATA
         READ STATE DATA
ID LIST ─┐         │        │
         ▼         ▼        ▼
```

| A1 | 1 | 0 |
|----|---|---|
| A2 | 0 | 0 |
| A3 | 0 | 0 |
| A4 | 0 | 0 |
| A5 | 1 | 0 |
| A6 | 0 | 0 |
| A7 | 1 | 0 |
| A8 | 0 | 0 |
| A9 | 0 | 0 |
| A10 | 1 | 0 |
| B1 | 0 | 0 |
| B2 | 0 | 0 |
| B3 | 0 | 0 |
| . | . | . |
| . | . | . |
| . | . | . |

FIG.8

OMISSION-IN-READING
POSSIBILITY STATE DATA

READ STATE DATA

ID LIST

| ID | READ STATE DATA | OMISSION-IN-READING POSSIBILITY STATE DATA |
|---|---|---|
| A1 | 1 | 0 |
| A2 | 0 | 1 |
| A3 | 0 | 1 |
| A4 | 1 | 0 |
| A5 | 1 | 0 |
| A6 | 1 | 0 |
| A7 | 1 | 0 |
| A8 | 1 | 0 |
| A9 | 1 | 0 |
| A10 | 1 | 0 |
| B1 | 1 | 0 |
| B2 | 1 | 0 |
| B3 | 1 | 0 |
| · | · | · |
| · | · | · |
| · | · | · |

| IDENTIFICATION ID OF RF TAG A2 | 0101・・・・0010 |
|---|---|
| IDENTIFICATION ID OF RF TAG A3 | 0101・・・・0011 |
| TAG SELECTION DATA | 0101・・・・001- |

FIG.14

PLEASE SELECT WORK TO EXECUTE

1:INVENTORY WORK (BATCH READING)

2:READ FROM SPECIFIC RF TAG (SELECTIVE READING)

3:ISSUANCE OF RF TAG (SELECTIVE WRITING)

FIG.16

THERE IS POSSIBILITY OF OMISSION IN READING IN GROUP A.
WOULD YOU LIKE TO EXECUTE OMISSION-IN-READING
COMMUNICATION MODE (SECOND COMMUNICATION MODE)?

FIG.23

| ID | MANUFACTURER | PRODUCT NAME | PRODUCT IMAGE FILE NAME | . | . | ↓ READ STATE DATA | ↓ OMISSION-IN-READING POSSIBILITY STATE DATA |
|---|---|---|---|---|---|---|---|
| A1 | COMPANY A | PRODUCT 1 BLUE | PRODUCT 1 BLUE | . | . | 0 | 0 |
| A2 | COMPANY A | PRODUCT 2 RED | PRODUCT 2 RED | . | . | 0 | 0 |
| A3 | COMPANY B | PRODUCT 3 YELLOW | PRODUCT 3 YELLOW | . | . | 0 | 0 |
| . | . | . | . | . | . | . | . |
| B1 | COMPANY B | PRODUCT B WHITE | PRODUCT B WHITE | . | . | . | . |
| . | . | . | . | . | . | . | . |

RF TAG READER AND RF TAG INFORMATION ACQUISITION METHOD

CROSS-REFERENCE TO RELATED APPLICATION

This application is based upon and claims the benefit of priority from Japanese Patent Application No. 2010-29451, filed on Feb. 12, 2010; the entire contents of which are incorporated herein by reference.

FIELD

Embodiments described in this disclosure relate to a tag information acquisition technique of acquiring (reading) the information stored in an RF tag by communication with the RF tag.

BACKGROUND

In recent years, an RFID (Radio Frequency Identification) system attracts attention and is widespread in the distribution sector, for example. The RFID system includes an RF tag (also referred to as an RFID tag), which includes an IC chip and an antenna and is attached to a product, and an RF tag reader and writer (hereinafter, simply referred to as a reader and writer), which reads information stored in the memory of the RF tag IC chip in a non-contact manner and writes information into the memory of the RF tag IC chip in a non-contact manner.

As processing in the RFID system, for example, there is processing of reading the information collectively from a plurality of RF tags during inventory work in a store or the like (hereinafter, referred to as batch read). In this case, the reader and writer emits radio waves over a distant range of several meters and executes communication with unspecified RF tags attached to a plurality of products in order to read the information stored in the RF tags collectively. In general, the RF tags to be read are disposed in a spatially wider range than the read range of an antenna of the reader and writer. Accordingly, during inventory work or the like, the tag information is acquired from RF tags while moving the antenna of the reader and writer to change the communication range.

In a known reader and writer, however, omission of reading occurred frequently because communication was generally performed while moving an antenna of the reader and writer. For this reason, a technique for detecting omission of reading and acquiring information from a tag which was not read is proposed. However, since reading work is performed while moving, the user is frequently beyond the range where communication with an unread tag is possible.

DESCRIPTION OF THE DRAWINGS

FIG. 7 is a view showing an example of a table to be read in the first embodiment;

FIG. 8 is a view showing an example of a table to be read in the first embodiment;

FIG. 9 is a view showing an example of a timing chart in communication processing based on ISO18000-6 type C related to the first embodiment;

FIG. 11 is a view showing an example of generation of tag selection data in the first embodiment;

FIG. 14 is a view showing an example of a processing start screen in the first embodiment;

FIG. 16 is a view showing an example of a screen for notification of a possibility of an omission in reading in the first embodiment;

FIG. 23 is a view showing an example of a table to be read in another embodiment.

DETAILED DESCRIPTION

An RF tag reader of the present embodiment is an RF tag reader including an omission-in-reading determining section which determines that an RF tag belonging to a predetermined group might be unread when the tag information is not acquired from an RF tag which belongs to the group and whose tag information is not acquired yet, within a predetermined time after the tag information corresponding to any one of a plurality of RF tags grouped as the predetermined group is acquired.

Hereinafter, a first embodiment will be described with reference to the accompanying drawings. Moreover, in the following explanation, an identification ID (tag ID) is mentioned as an example of tag information stored in an RF tag.

Moreover, for easy understanding, it is assumed that the identification information corresponding to each RF tag is also an identification ID stored in each RF tag. That is, in the first embodiment, the tag information and the identification information corresponding to an RF tag are shared.

Figure 1:
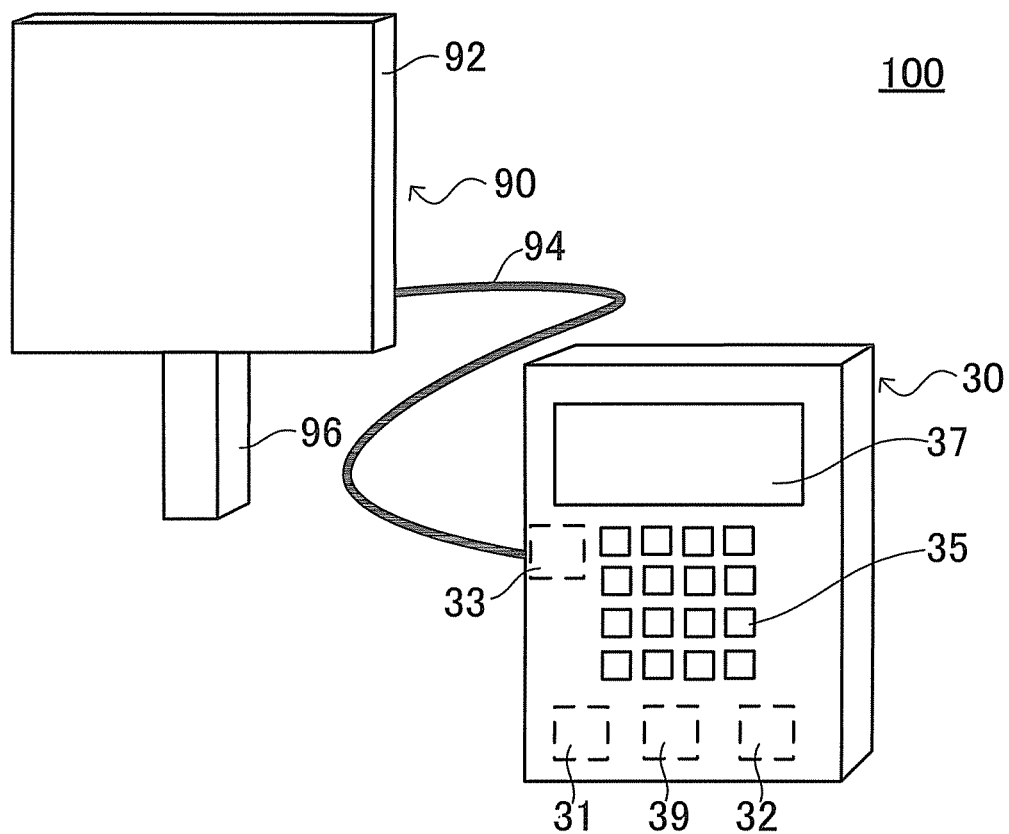
FIG. 1 is a perspective view of an RF tag reader and writer according to a first embodiment.

FIG. 1 is a perspective view showing the outline of an RF tag reader and writer 100 according to the first embodiment. The reader and writer 100 of the first embodiment includes an antenna device 90, which has an antenna (not shown) inside a housing 92, and a reader and writer body 30. The antenna device 90 and the reader and writer body 30 are connected to each other by a coaxial cable 94.

Although an antenna provided in the antenna device 90 is not particularly limited, it may be a patch antenna, for example. The reader and writer 100 communicates with an RF tag (not shown) through radio waves emitted from the antenna. In addition, in the first embodiment, a gripping member 96 is provided in the antenna housing 92, so that it is easy to grip the antenna device 90 when a user uses the reader and writer 100 while carrying it. Undoubtedly, it is also possible to adopt a configuration where the gripping member 96 is not provided.

Figure 2:
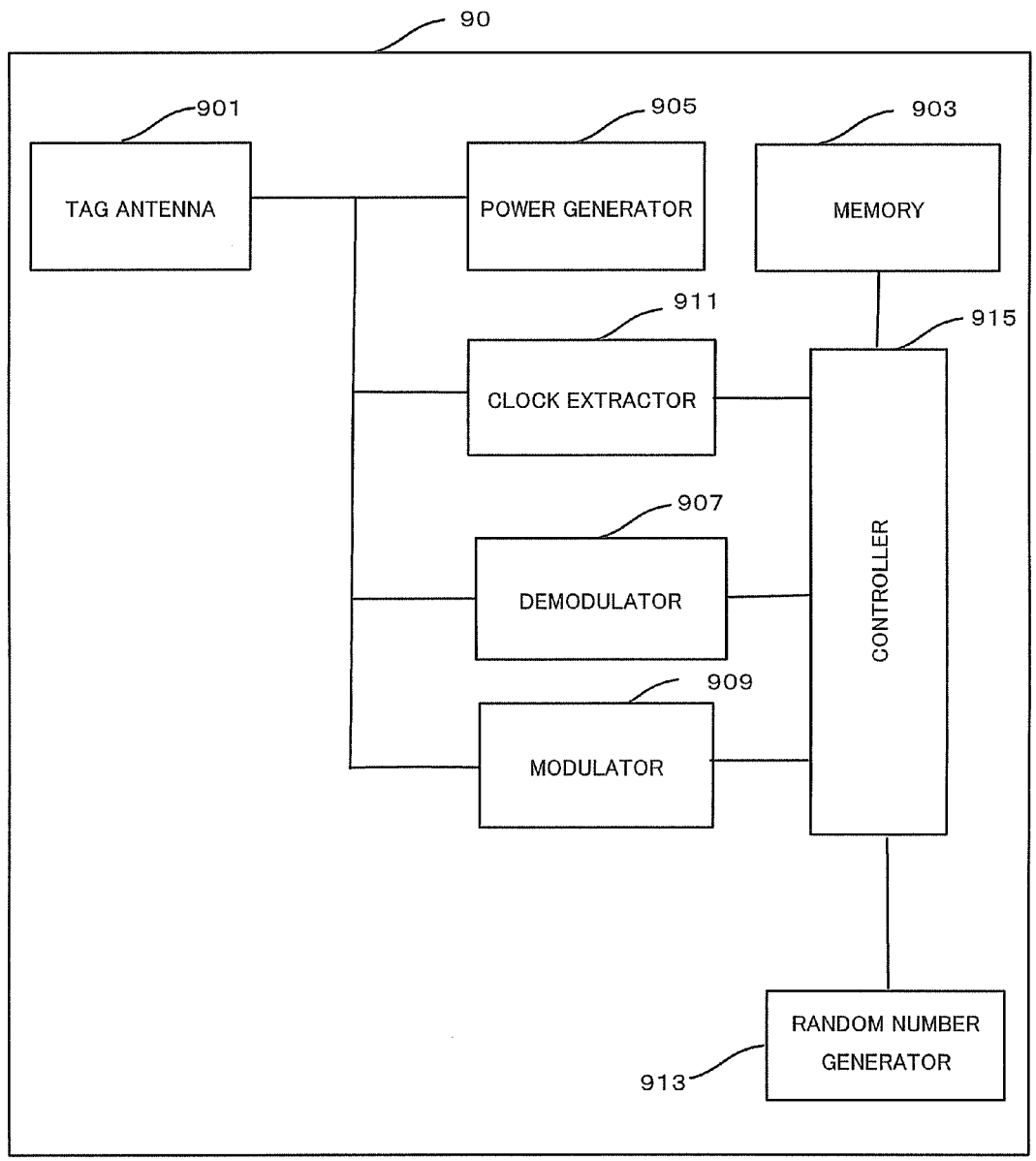
FIG. 2 is a block diagram showing the hardware configuration of an RF tag in the first embodiment.

FIG. 2 shows an example of a functional block of an RF tag. An RF tag is a type of wireless data carrier attached to a product, a delivery, and the like, and is an independent part in which a tag antenna, through which signals can be transmitted and received, and an IC chip are integrally formed on a substrate. An IC chip 900 includes: a memory 903 which can store a predetermined information signal (tag information); a power generator 905 which supplies power to each section of the IC chip 900 by performing rectification and stabilization of a modulated wave received through a tag antenna 901; a demodulator 907 which demodulates the modulated wave and transmits it to a controller (demodulates a communication signal); a modulator 909 which modulates the data transmitted from the controller and transmits it to the tag antenna (modulates a response signal); a clock extractor 911 which extracts a clock signal from the modulated wave received through the tag antenna 901 and supplies it to a controller 915; a random number generator 913 which generates random numbers of 0 to $2^{Q-1}$ corresponding to a slot number designation value Q, which is designated to the modulated wave, for determining to which identification slot the RF tag is to output a response signal when the modulated wave is received from the reader and writer 100; and the controller 915 which controls an operation of the RF tag through the memory 903, the demodulator 907, the modulator 909, the clock extractor 911, the random number generator 913, and the like.

Figure 3:
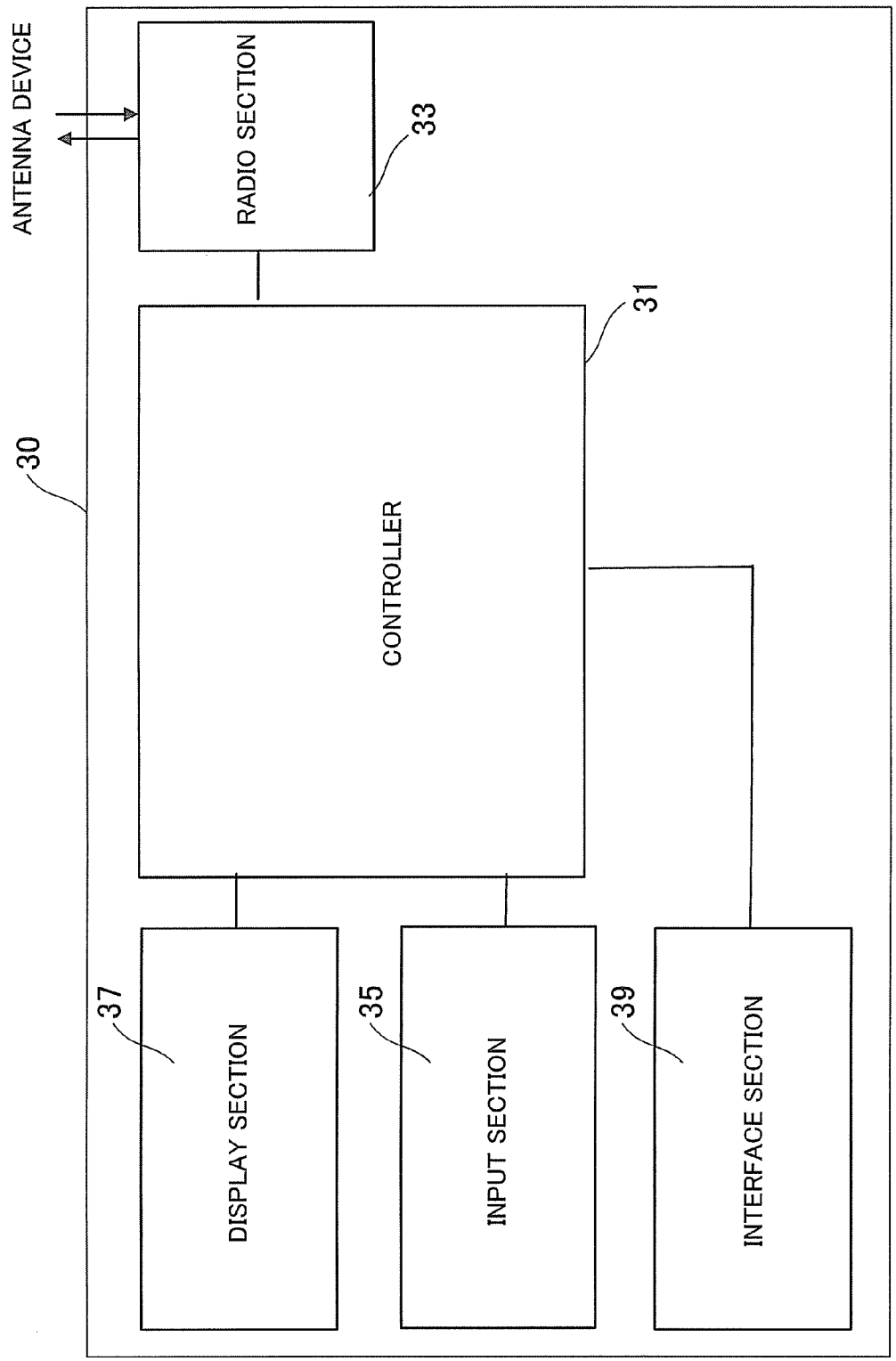
FIG. 3 is a block diagram showing the hardware configuration of the RF tag reader and writer according to the first embodiment.

Next, the hardware configuration of the reader and writer body 30 will be described. As shown in FIG. 3, the reader and writer body 30 has a controller 31, a radio section 33, an input section 35, a display section 37, and an interface section 39. In addition, a current is supplied to the hardware and the antenna device 90 from a power supply 32 shown in FIG. 1, which controls a battery and charge and discharge of the battery. Therefore, the reader and writer 100 of the first embodiment is formed as a portable reader and writer.

The controller 31 has a role of performing various kinds of processing in the reader and writer 100, such as communication with an RF tag and communication with an external device such as a PC (Personal Computer; not shown) through a network, by executing a program stored in a storage section 311, which will be described later, on the basis of an input from the user. For example, the controller 31 controls the radio section 33 according to a communication protocol such that an identification ID, which is acquired from a PC through the interface section 39 to be described later or which is input through the input section 35 to be described later by the user, is transmitted to an RF tag through radio waves from the antenna device 90. In addition, the controller 31 controls the radio section 33, which will be described later, on the basis of the output information stored in the storage section 311, which will be described later, of the controller 31 such that radio waves are emitted from the antenna device 90 by transmission output indicated by the output information.

Figure 4:
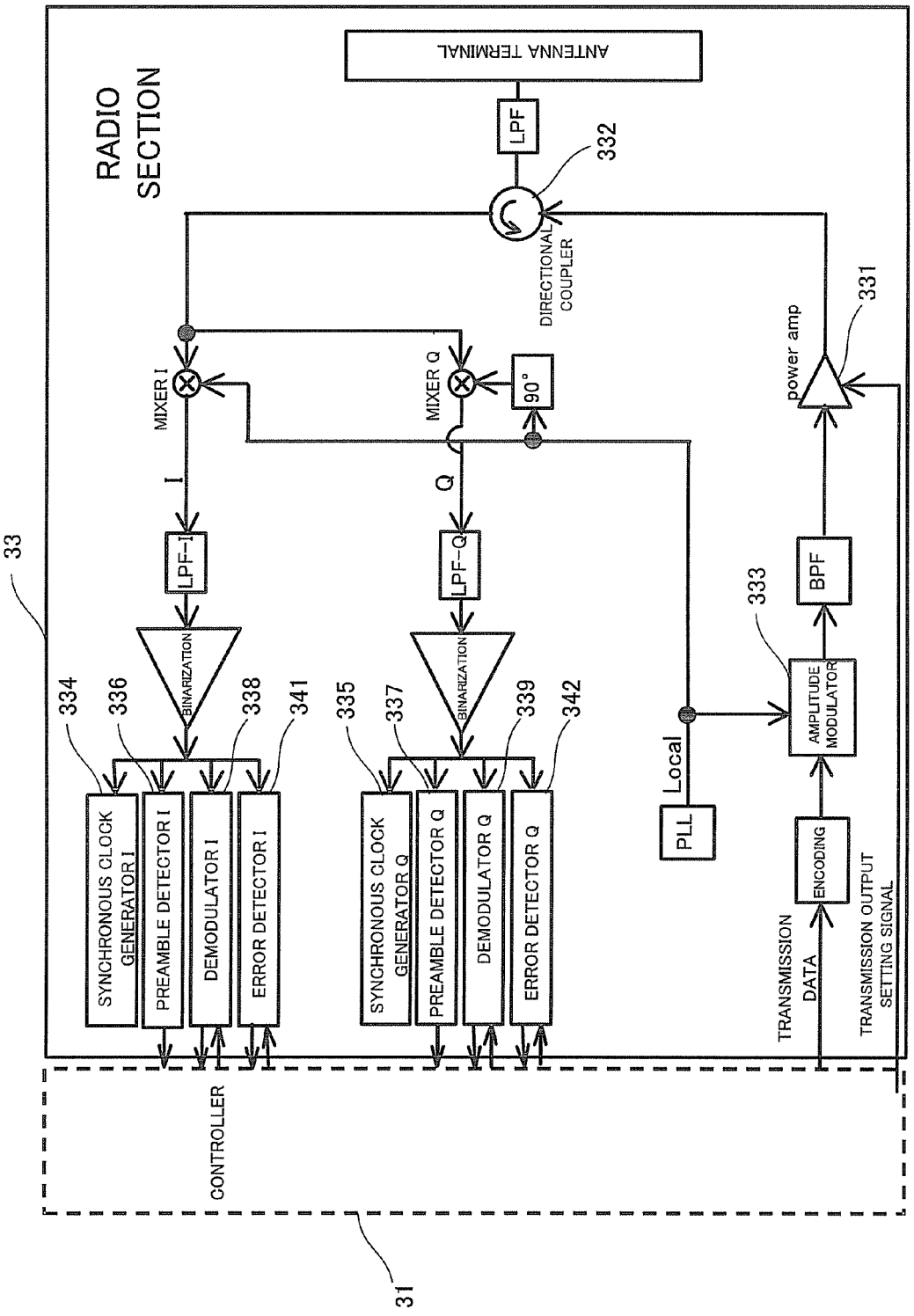
FIG. 4 is a view showing the circuit configuration of a radio section provided in the RF tag reader and writer according to the first embodiment.

The radio section 33 is hardware with a function for communicating with an RF tag through the antenna device 90. FIG. 4 shows the detailed circuit configuration of the radio section 33.

Here, if the RF tag is a passive tag which does not have a battery, the radio section 33 starts the RF tag by amplifying an unmodulated carrier with a power amplifier 331 first and outputting electromagnetic waves from the antenna through a directional coupler 332. When transmitting the data to an RF tag, it is transmitted by performing amplitude modulation of a signal encoded according to the communication protocol using an amplitude modulator 333 and amplifying it using the power amplifier 331 and then outputting electromagnetic waves from the antenna through the directional coupler 332. In addition, when receiving a signal from the RF tag, the RF tag controls (backscatters) the impedance of an antenna terminal in a state where an unmodulated carrier is being transmitted from the reader and writer 100. As a result, the reflection state changes, and this is detected by the antenna device of the reader and writer 100. The directional coupler 332 performs quadrature demodulation of the received electromagnetic wave signal. Synchronous clock generators I and Q 334 and 335 generate a synchronous clock, and preamble detectors I and Q 336 and 337 detect a preamble decided in advance in order to detect the head of the data. Demodulators I and Q 338 and 339 demodulate it to obtain the received data. In addition, error detectors I and Q 341 and 342 detect the existence of an error using an error detection code. In the case shown in FIG. 3, a configuration is adopted in which it is determined that the data was received correctly if there is no error in either demodulation of an in-phase component in quadrature demodulation or demodulation of a quadrature component. Moreover, by control (specifically, transmission of a transmission output setting signal for setting a transmission output) of a transmission output controller 315 of the controller 31, the transmission output of the power amplifier 331 can be set according to the type of processing.

The input section 35 is hardware used when a user inputs an instruction to the reader and writer 100 using the input section 35. Specifically, the input section 35 is formed by buttons (keys), a touch pad, and the like which make it possible to input an instruction by pressing.

The display section (display) 37 is hardware which can be used to show a result of communication with an RF tag for the user or to prompt the user to input an instruction. Specifically, the display section 37 can be formed by an LCD (Liquid crystal display) or the like. In addition, the display section 37 may be formed as a graphical display, in which a touch panel sensor is mounted, and the input section 35 and the display section 37 may be unified.

The interface section 39 is hardware for performing communication with an external device, such as a PC in which an identification ID is stored, through a network.

Figure 5:
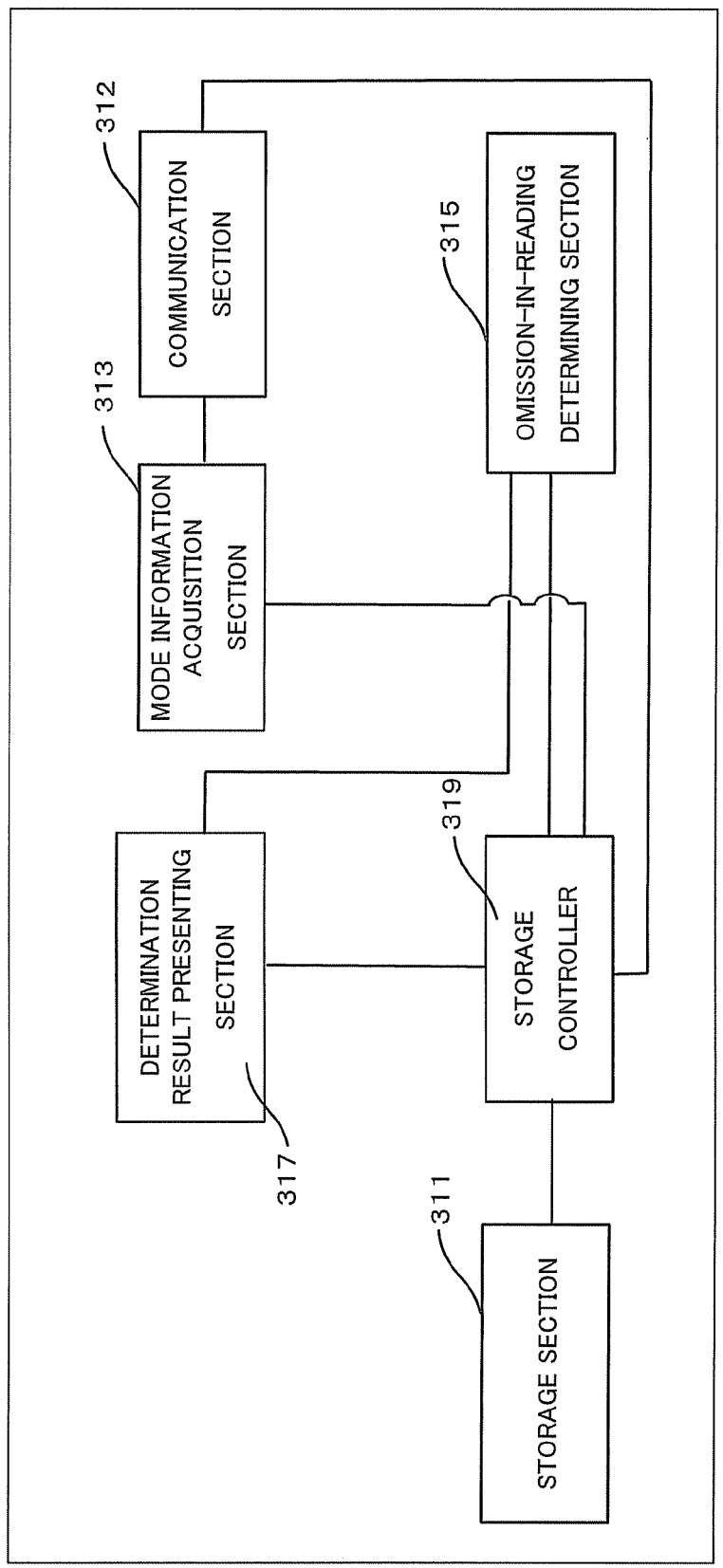
FIG. 5 is a functional block diagram regarding determination of a possibility of an omission in reading in the RF tag reader and writer according to the first embodiment.

Next, a functional block of the controller 31 will be described. As shown in FIG. 5, the controller 31 includes the storage section 311, a communication section 312, a mode information acquisition section 313, an omission-in-reading determining section 315, a determination result presenting section 317, and a storage controller 319, which will be described below.

The storage section 311 stores an acquired identification ID, a record (log) related to processing performed in the controller 31 or each functional block of the controller 31, or a communication protocol (for example, a communication protocol of an RF tag based on ISO18000-6 type C) for transmitting an identification ID through radio waves. Moreover, in the first embodiment, an ID list, which is list data of identification IDs to be read that is stored in advance in the storage section 311, and read state data and omission-in-reading possibility state data (equivalent to mark information if it is 1; will be described in detail later) corresponding to the ID list are stored in the storage section 311 as a table to be read shown in FIGS. 7 and 8 which will be described later. The content of the read state data and the omission-in-reading possibility state data is updated according to the determination result of the omission-in-reading determining section 315 and the acquisition of an identification ID determined that it might be unread through the communication section 312.

The communication section 312 controls the radio section 33 to executes communications processing on an RF tag using a slot aloha method of executing the processing for communication with an RF tag in a plurality of time slots (hereinafter, simply referred to as a slot) included in a round. More specifically, the communication section 312 of the first embodiment executes communication processing according to the protocol of ISO18000-6 type C.

In addition, in the first embodiment, the communication section 312 has a first communication mode, in which processing of acquiring the tag information is executed on an RF tag whose tag information is not acquired yet, and a second communication mode, in which processing of acquiring the tag information is selectively executed only on an RF tag which might be unread, which is indicated in the omission-in-reading possibility state data of the table to be read.

Moreover, in the second communication mode, tag selection information for limiting RF tags whose information is to be acquired is generated on the basis of identification IDs stored in the table to be read, the tag selection information is set as a select command and transmitted to an RF tag which might be unread, and processing of acquiring an identification ID from the RF tag is executed.

The mode information acquisition section 313 acquires the mode designation information regarding a user's request to designate the first communication mode or the second communication mode in the communication section 312 through the input section 35 and transmits the mode designation information to the communication section 312.

The omission-in-reading determining section 315 determines that an RF tag (whose identification ID is not acquired yet) belonging to a predetermined group might be unread when an identification ID cannot be acquired from the RF tag belonging to the group within a predetermined time after an identification ID corresponding to any one of the plurality of RF tags grouped as the predetermined group is acquired.

The determination processing of the omission-in-reading determining section 315 will be specifically described. First, the communication section 312 acquires an identification ID of an RF tag in the first communication mode. Then, the communication section 312 transmits the acquired identification ID to the omission-in-reading determining section 315. When acquiring the identification ID from the communication section 312, the omission-in-reading determining section 315 transmits the acquired identification ID to the storage controller 319 to update a table to be read and also acquires a table to be read updated from the storage section 311 through the storage controller 319. Then, using the table to be read, the omission-in-reading determining section 315 specifies a group to which the RF tag corresponding to the acquired identification ID belongs and starts time counting for the specified group. In addition, when an identification ID of an RF tag, which belongs to the same group until a predetermined time elapses from the start of time counting and whose identification ID is not acquired yet, cannot be acquired from the communication section 312, the omission-in-reading determining section 315 determines that an RF tag belonging to the group might be unread. The omission-in-reading determining section 315 notifies the storage controller 319 of the determination result that there is a possibility of an omission in reading in a specific group and also notifies the determination result presenting section 317 that it was determined that there was a possibility of an omission in reading.

On the other hand, the communication section 312 may acquire an identification ID of an RF tag of a certain group and then acquire an identification ID from an RF tag (whose identification ID was not acquired yet) belonging to the same group. Then, as a result, the omission-in-reading determining section 315 may acquire an identification ID of an RF tag, whose identification ID was not acquired yet, of the group within a predetermined time after acquiring the identification ID of the RF tag of the certain group. In this case, the omission-in-reading determining section 315 transmits the acquired identification ID to the storage controller 319 and determines that there is no possibility of an omission in reading for the group.

When acquiring the notification that there is a possibility of an omission in reading from the omission-in-reading determining section 315, the determination result presenting section 317 acquires a table to be read, which is stored in the storage section 311, through the storage controller 319 and displays the determination result on the display section 37 on the basis of the table. Specifically, when an identification ID of an RF tag which might be unread is present in a table to be read, the omission-in-reading determining section 315 notifies a user, on the display section 37, that there is an RF tag which might be unread.

The storage controller 319 controls update processing of updating the information stored in the storage section 311 using the acquired information, storage processing of storing the newly acquired information in the storage section 311, and processing of reading the information stored in the storage section 311. Moreover, in the first embodiment, the storage controller 319 updates the read state data in the table to be read according to the determination result transmitted from the omission-in-reading determining section 315. In the table to be read, all of the read state data are 0 and all of the omission-in-reading possibility state data are also 0 when the communication section 312 starts the first read processing. In addition, when acquiring the identification ID from the omission-in-reading determining section 315, the storage controller 319 updates the read state data corresponding to the acquired identification ID to 1. In addition, when acquiring from the omission-in-reading determining section 315 a determination result indicating that there is a possibility of an omission in reading in a specific group, the storage controller 319 stores the determination result in the storage section 311 and updates the omission-in-reading possibility state data of an identification ID, whose read state data in the specific group is not updated to 1 until the acquisition of the determination result, to 1. In addition, if the communication section 312 acquires an identification ID from an RF tag when the communication section 312 operates in the second communication mode, the communication section 312 transmits the identification ID to the storage controller 319. According to the acquisition of the identification ID from the communication section 312, the storage controller 319 stores the acquired identification ID in the storage section 311, and updates the omission-in-reading possibility state data of the identification ID to 0 and updates the read state data of the identification ID to 1.

Figure 6:
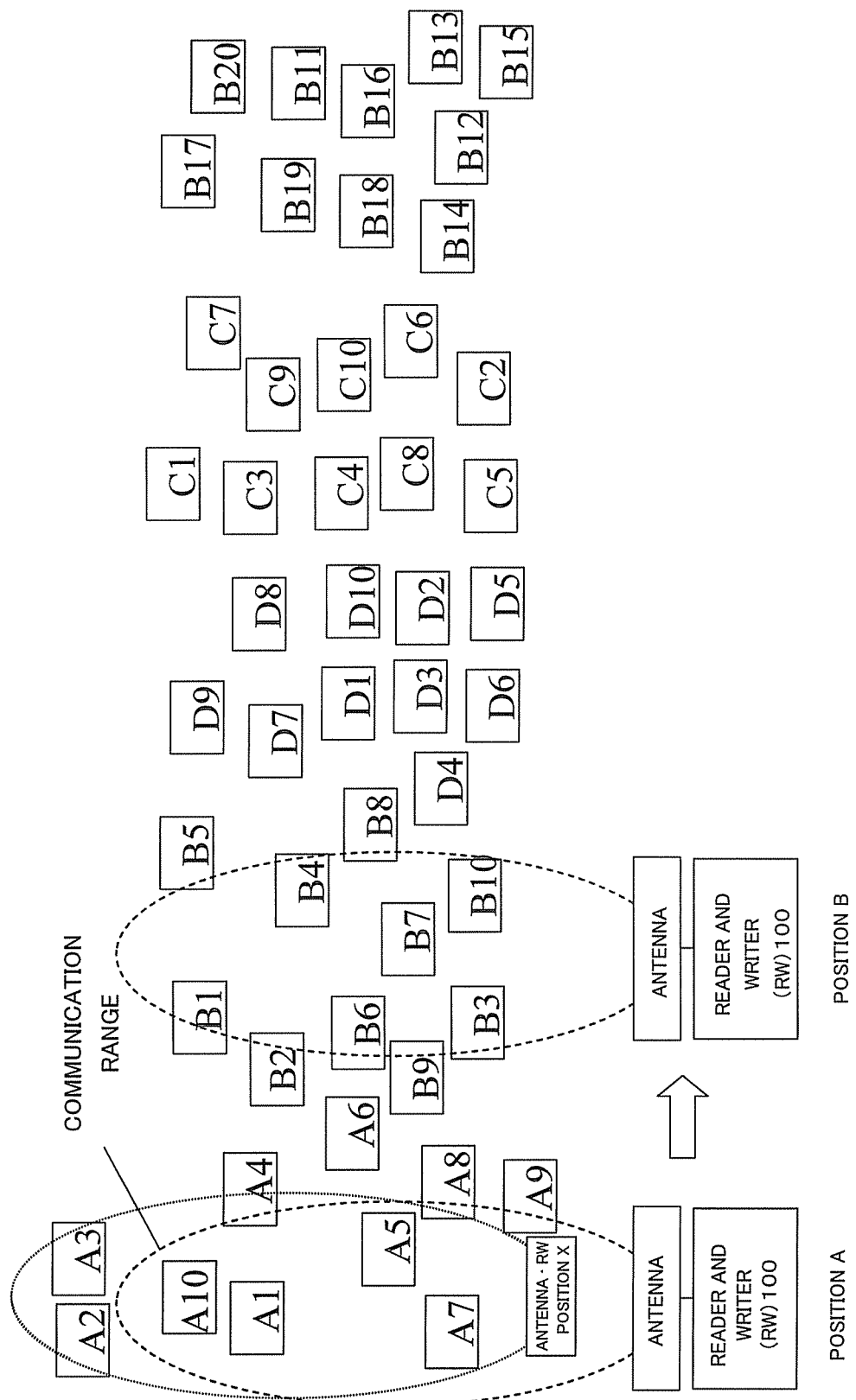
FIG. 6 is a view showing an example of the movement of the RF tag reader and writer according to the first embodiment.

Hereinafter, the identification ID acquisition processing of the communication section 312 in the first and second communication modes in the first embodiment will be described in more detail. In the following explanation, the case where an RF tag is read by the antenna of the reader and writer 100 when RF tags attached to products are disposed as shown in FIG. 6 will be given as an example. The antenna of the reader and writer 100 is at a position A at first and gradually moves to the right side (position B side) of the drawing while reading RF tags. In FIG. 6, a broken line indicates a communication range. The communication range in FIG. 6 refers to a range where communication can be correctly performed except for the case of collision if an RF tag is completely included in this range.

Figure 9:
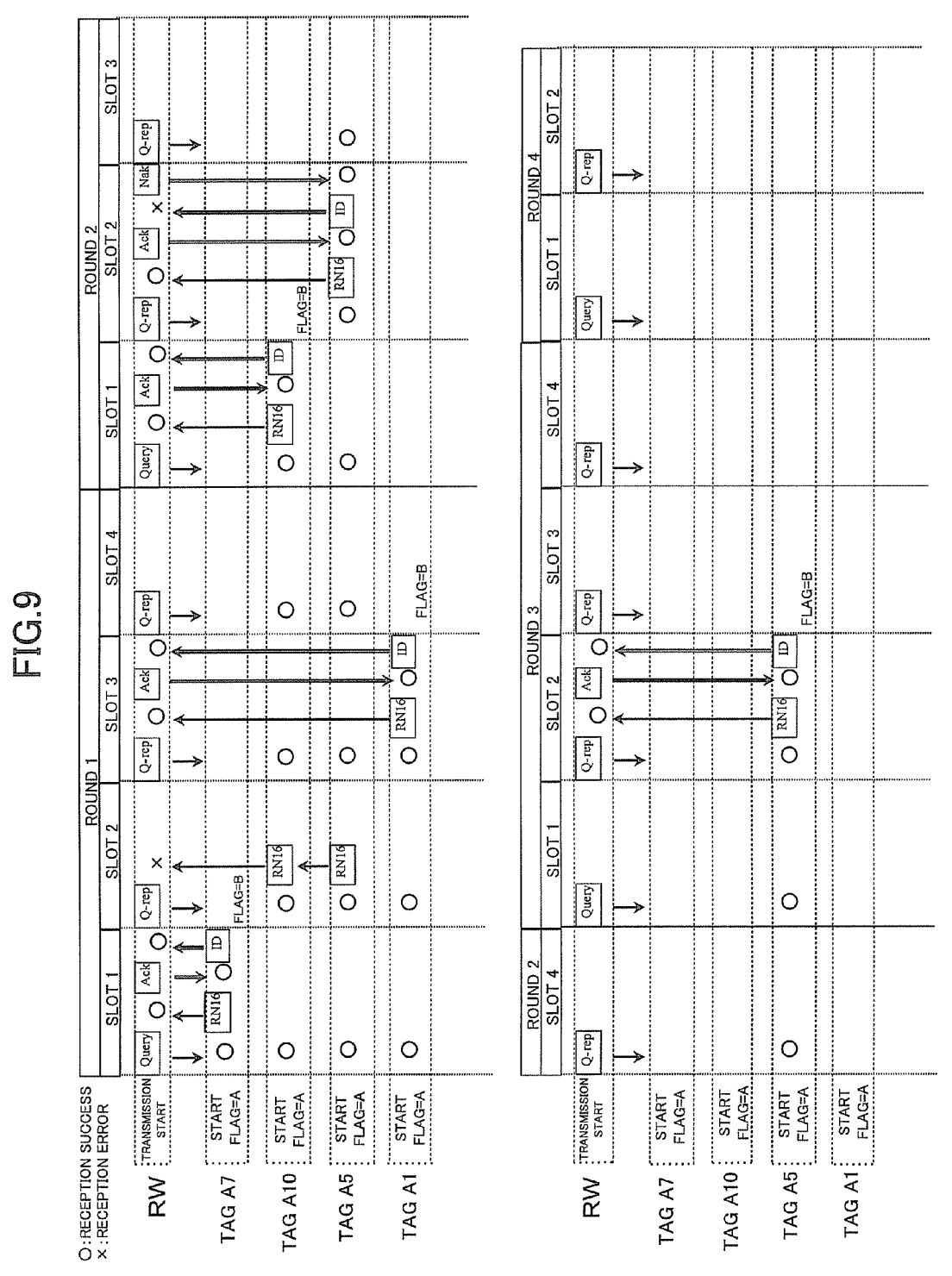

In addition, in tables to be read shown in FIGS. 7 and 8, RF tags (A1 to A10) near the position A in FIG. 6 are grouped as a group A and RF tags (B1 to B10) near the position B in FIG. 6 are grouped as a group B. In addition, FIG. 7 shows a table to be read when an antenna is at the position A. In addition, FIG. 8 shows a table to be read when an antenna is at the position B. In addition, FIG. 9 illustrates a timing chart of processing (identification ID acquisition processing) of communication with an RF tag in the communication section 312 when one round has four time slots. In this case, the antenna is at the position A. Accordingly, the case where identification IDs of RF tags A1, A5, A7, and A10 are read is illustrated. Here, as shown in FIG. 6, the RF tags A1, A5, A7, and A10 are within the communication range, but RF tags A2 and A3 are outside the communication range.

First, the first communication mode will be described. First, the communication section 312 acquires, through the mode information acquisition section 313, the mode designation information regarding a user's request to designate the first communication mode. Then, when the mode designation information designating the first communication mode is acquired, the communication section 312 performs processing of acquiring an identification ID of an RF tag, whose tag information is not acquired, according to the protocol of ISO18000-6 type C. Specifically, first, the communication section 312 starts transmission of electromagnetic waves through the radio section 33. In this case, since the purpose of the electromagnetic waves is to supply electric power to an RF tag, an unmodulated carrier is transmitted. As a result, the RF tags A1, A5, A7, and A10 located within the communication range in FIG. 6 are started in response to the electromagnetic waves. In addition, although not shown, each RF tag has a flag (Inventoried flag). In FIG. 9, a flag of each RF tag at the start of the RF tag is assumed to be A.

The communication section 312 transmits a Query command after the start of transmission of an unmodulated carrier. The Query command includes at least a parameter, which designates the number of slots per round, and a parameter indicating that the flag is for an RF tag of A. In FIG. 9, flags of the RF tags A1, A5, A7, and A10 are A. If the Query command is received, these RF tags generate a random number and determine which slot among the slots in one round will send a response. In addition, the RF tags also generate the data RN16 when sending a response. A slot and RN16 which send a response are determined on the basis of a random number by each RF tag. In particular, the RN16 becomes a different value according to an RF tag. Accordingly, since RN16 responses of RF tags are different, a collision is reduced. Here, for the sake of convenience, an explanation will be given assuming that there is no collision.

Referring to FIG. 9, in the first slot (slot 1), one RF tag transmits RN16 as a response. The communication section 312 receives the RN16 transmitted from the RF tag correctly. Then, the communication section 312 transmits an Ack command including the received RN16. After receiving the Ack command, the RF tag checks whether or not the RN16 transmitted by itself is included. If the RN16 is included, the RF tag determines that the Ack command is addressed to itself. In this case, the RF tag transmits an identification ID as a response. The communication section 312 receives this correctly.

Then, the communication section 312 transmits a Q-rep (Query-rep) command and proceeds to the next slot (slot 2), and another RF tag communicates with the communication section 312 similarly. The Query-rep command also includes at least a parameter indicating the same flag as described above. When proceeding to the next slot, the RF tag which was correctly received in the communication section 312 as an ID response in the previous slot sets its flag to B.

If one round ends, the communication section 312 transmits a Query command again. Similar to the above, the Query command includes at least a parameter, which designates the number of slots per round, and a parameter indicating that the flag is for an RF tag of A. Alternatively, from the second round, the communication section 312 may transmit a Query-adjust command including a parameter of the above flag.

In addition, if a collision occurs because a plurality of RF tags transmits RN16 responses and accordingly, the communication section 312 cannot receive the RN16 correctly in the round 1, the RF tag may be configured to perform communication again in the next round.

Through the above-described procedure (ISO18000-6 type C), the communication section 312 acquires identification IDs of the RF tags A1, A5, A7, and A10. On the other hand, the RF tags A2 and A3 shown in FIG. 6 are not read because they are located outside the communication range.

In the first embodiment, if the communication section 312 acquires one of the RF tags (A1 to A10) included in the group A, the communication section 312 transmits a corresponding identification ID to the omission-in-reading determining section 315. The omission-in-reading determining section 315 transmits the identification ID to the storage controller 319, and the storage controller 319 updates the read state data corresponding to the identification ID to 1. Then, the omission-in-reading determining section 315 starts time counting for the group A.

Figure 10:
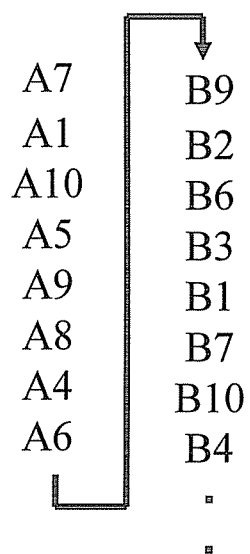
FIG. 10 is a view showing an example of the order of reading RF tags in the first embodiment.

The communication section 312 acquires identification IDs of RF tags belonging to the group A, for example, in order shown in FIG. 10 while the antenna moves from the position A toward the position B. The acquired identification IDs are transmitted from the communication section 312 to the omission-in-reading determining section 315. If the omission-in-reading determining section 315 acquires a next new identification ID before a predetermined time elapses after the acquisition of an identification ID in the same group, the omission-in-reading determining section 315 determines that there is no unread RF tag and transmits the identification ID to the storage controller 319. For example, in FIG. 10, when an identification ID of A9 is acquired within a predetermined time from the acquisition of an identification ID of A5, it is determined that there is no unread RF tag. In addition, the storage controller 319 stores the acquired identification ID in the storage section 311 and updates the read state data corresponding to the identification ID to 1.

On the other hand, even if a predetermined time elapses after the acquisition of a one-previous identification ID in the same group, the omission-in-reading determining section 315 may not acquire an identification ID, whose tag information is not acquired yet, belonging to the group. For example, the case is assumed in which identification IDs of the RF tags A2 and A3 shown in FIG. 6 cannot be acquired even if a predetermined time elapses after an identification ID of A6 is acquired. In this case, the omission-in-reading determining section 315 determines that there is a possibility of an omission in reading in the group A. The omission-in-reading determining section 315 notifies the storage controller 319 of the determination result. On the basis of the determination result, the storage controller 319 updates to 1 the omission-in-reading possibility state data corresponding to identification IDs (identification IDs of A2 and A3), of which read state data were not updated to 1, of the group A in the table to be read.

In addition, although the above explanation was given only for the group A for easy understanding, the acquisition of identification IDs is performed in parallel not only for identification IDs belonging to the group A but also identification IDs belonging to the other groups. The omission-in-reading determining section 315 performs identification ID acquisition and omission-in-reading possibility determination processing similarly for RF tags of the other groups shown in FIGS. 6 to 8.

Next, the case where the second communication mode is selected by the user will be described.

In this case, the mode information acquisition section 313 acquires, through the input section 35, the mode designation information regarding a user's request of identification ID acquisition processing based on the second communication mode. The mode information acquisition section 313 transmits the mode designation information designating the second communication mode to the communication section 312.

If the mode input information is acquired, the communication section 312 acquires a table to be read, which is stored in the storage section 311, through the storage controller 319. Then, on the basis of this table to be read, the communication section 312 generates tag selection data to be set to a Select command, which will be described later, from an identification ID of an RF tag whose omission-in-reading possibility state data is 1. Then, using the tag selection data, the communication section 312 performs selective communication with the RF tag determined to have a possibility of an omission in reading.

Moreover, in the first embodiment, if there is one identification ID of an RF tag which might be unread, the identification ID is set to the tag selection data. In addition, if there is a plurality of identification IDs of RF tags which might be unread, the tag selection data is generated by comparison of identification IDs of RF tags whose omission-in-reading possibility state data is 1. For example, when generating the tag selection data from identification IDs of A2 and A3, the communication section 312 extracts a common portion of the identification IDs of A2 and A3 to generate the tag selection data, as shown in FIG. 11.

Figure 12:
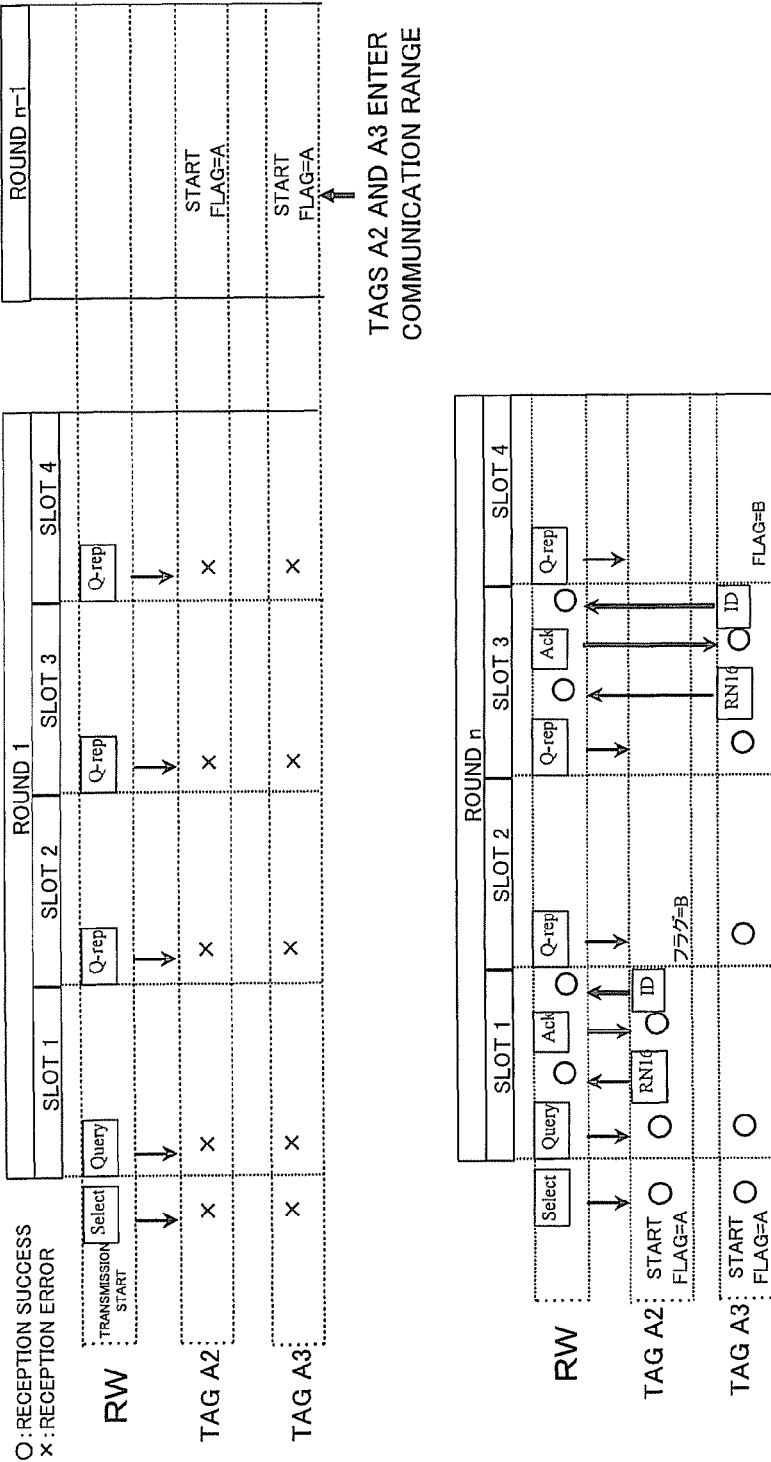
FIG. 12 is a view showing an example of a timing chart in communication processing based on ISO18000-6 type C related to the first embodiment.

FIG. 12 is a view illustrating a timing chart of processing for communication with an RF tag in the second communication mode. Although the communication section 312 also performs communication with an RF tag based on ISO18000-6 type C in the second communication mode, the communication section 312 transmits a Select command, in which the tag selection data is set, at the head of a round in the second communication mode. By this Select command, the RF tags A2 and A3 are designated as RF tags which send a response.

Then, the reader and writer 100 executes processing for communication with the RF tags A2 and A3. Moreover, when the antenna moves from the position B side in FIG. 6 to the position (for example, the position X in FIG. 6) where the RF tags A2 and A3 enter the communication range, the communication section 312 can acquire the identification IDs of the RF tags A2 and A3. More specifically, when the antenna is at the position X, the communication section 312 transmits a Select command before round n. If the RF tags A2 and A3 receive the Select command correctly, the RF tags A2 and A3 determine that they are communication targets. Then, the RW transmits a Query command, and the RF tags A2 and A3 receive the Query command correctly. FIG. 12 shows an example where the RF tag A2 transmits an identification ID to the communication section 312 in the slot 1 and the RF tag A3 transmits an identification ID to the communication section 312 in the slot 3.

Then, the communication section 312 transmits the acquired identification IDs of the RF tags A2 and A3 to the storage controller 319. The storage controller 319 stores the acquired identification IDs in the storage section 311 and updates the read state data, which corresponds to the identification IDs of the RF tags A2 and A3 in the table to be read, from 0 to 1 and also updates the omission-in-reading possibility state data from 1 to 0.

That is, in the first embodiment, when executing processing of acquiring the tag information in the second communication mode, the communication section 312 does not transmit the acquired identification ID to the omission-in-reading determining section 315. Accordingly, the omission-in-reading determining section 315 does not perform determination processing, which is related to the possibility of an omission in reading, for an RF tag whose tag information is to be acquired in the second communication mode.

Figure 13:
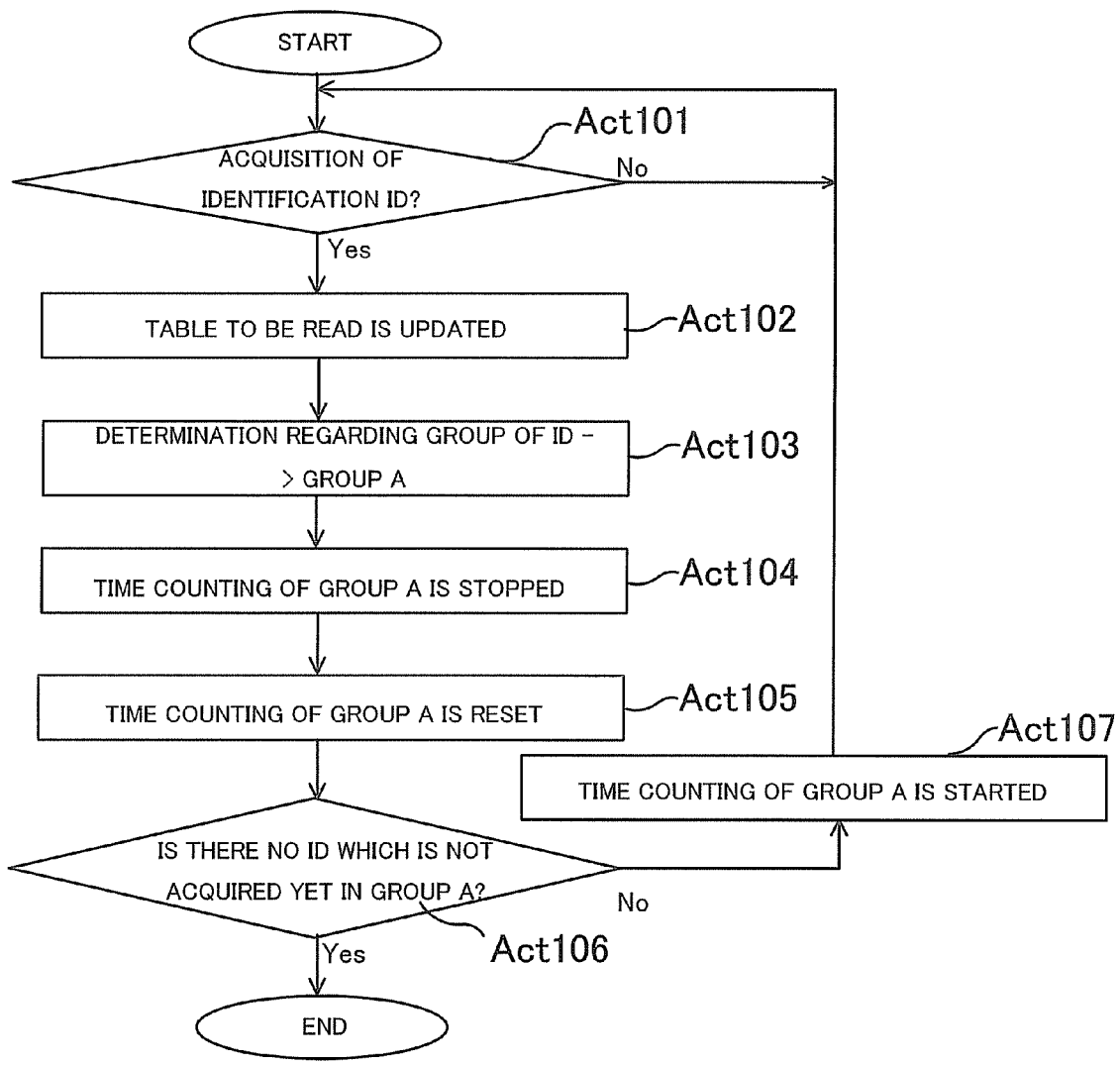
FIG. 13 is a view showing the process flow regarding determination of a possibility of an omission in reading in the first embodiment.

Next, the process flow of time counting in the omission-in-reading determining section 315 when the reader and writer 100 of the first embodiment executes communication with an RF tag in read processing (batch read processing) on an unspecified number of RF tags will be described with reference to FIG. 13. In other words, the process flow of time counting used in order to perform determination regarding a possibility of an omission in reading when the communication section 312 executes communication with an RF tag in the first communication mode will be described. In addition, for easy understanding, the case where identification ID acquisition processing is executed on an RF tag belonging to the group A shown in FIG. 6 will be given as an example (the same for other process flows) in the following explanation.

First, in Act 101, the communication section 312 controls the radio section 33 to emit radio waves related to batch reading from the antenna device 90, performs batch reading, and executes processing of acquiring the information (identification ID) stored in RF tags of the group A. The communication section 312 executes corresponding processing until an identification ID is acquired (Act 101, no). If an identification ID is acquired, the communication section 312 transmits the acquired identification ID to the omission-in-reading determining section 315 (Act 101, yes).

Then, in Act 102, the omission-in-reading determining section 315 transmits the acquired identification ID to the storage controller 319 and updates a table to be read through the storage controller 319. Specifically, the read state data corresponding to the acquired identification ID is updated from 0 to 1. In addition, when the omission-in-reading possibility state data corresponding to the acquired identification ID is 1, it is updated to O. In addition, the storage controller 319 transmits the updated table to be read to the omission-in-reading determining section 315.

Then, in Act 103, the omission-in-reading determining section 315 specifies to which group the identification ID acquired from the communication section 312 belongs using the acquired table to be read. In this explanation, for example, when an identification ID of the RF tag A9 shown in FIG. 6 is acquired, the omission-in-reading determining section 315 specifies that the acquired identification ID is an identification ID of an RF tag belonging to the group A on the basis of the table to be read. Specifically, such specification can be realized using a record (log) of the acquired identification IDs and the table to be read.

Then, the omission-in-reading determining section 315 stops time counting for determination regarding a possibility of an omission in reading in the group A to which the acquired identification ID belongs (Act 104). Then, the omission-in-reading determining section 315 resets counting of a time (Act 105). Then, the omission-in-reading determining section 315 determines whether or not an RF tag whose identification ID is not acquired yet is present in the group A, which is the same group as the acquired identification ID, on the basis of the table to be read (Act 106). If an RF tag whose identification ID is not acquired yet is present in the group A, the omission-in-reading determining section 315 newly starts time counting (Act 109). Then, the controller 31 returns to Act 103 to continue processing. On the other hand, if an RF tag whose identification ID is not acquired yet is not present in the group A, the omission-in-reading determining section 315 does not start time counting, and the controller 31 ends the information acquisition processing on the RF tag belonging to the group A.

Moreover, in the first embodiment, the first communication mode is executed by acquiring the input designation information regarding the first communication mode by the mode information acquisition section in response to a user's input through a screen, which is displayed on the display section 37 by the controller 31 and is illustrated in FIG. 14.

Figure 15:
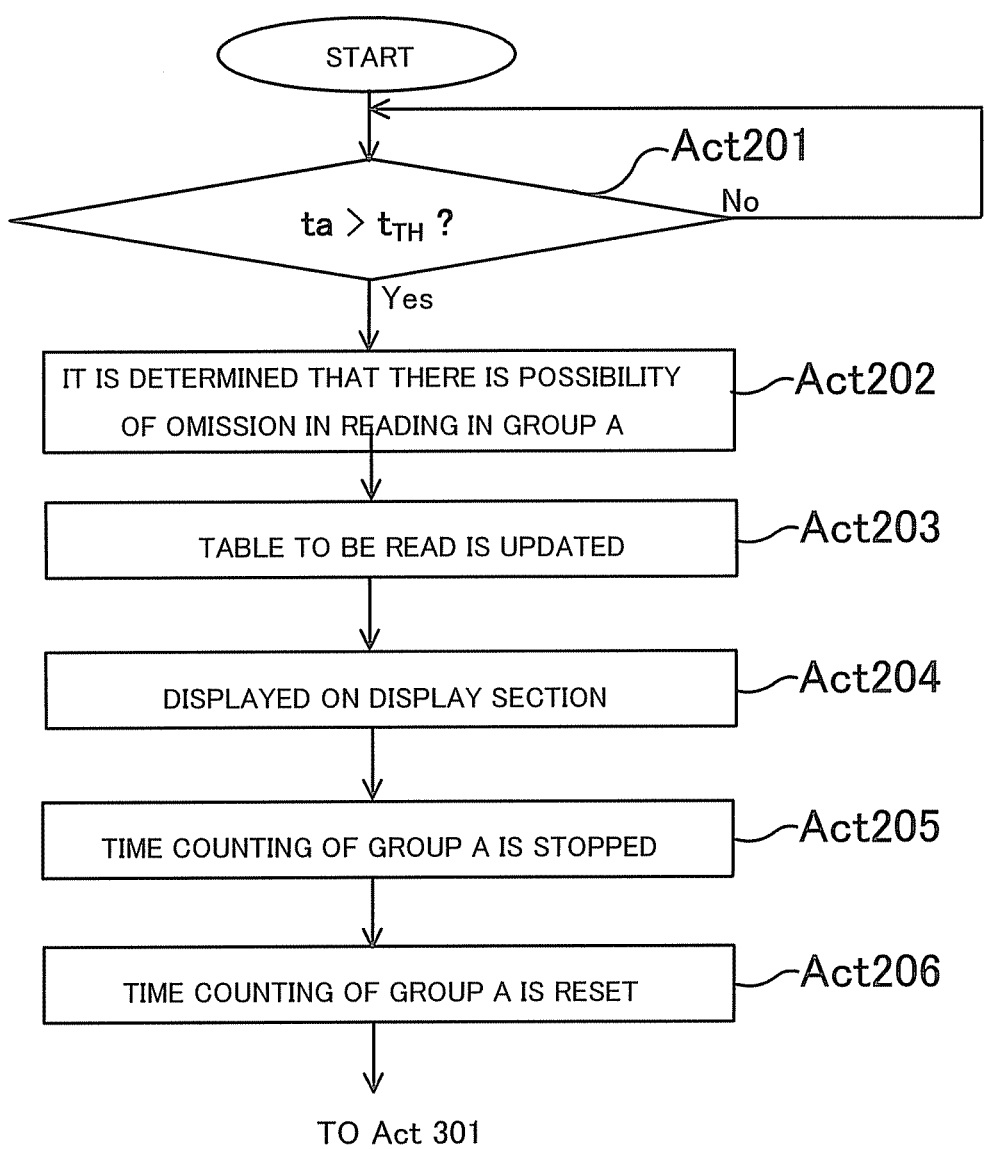
FIG. 15 is a view showing the process flow regarding determination of a possibility of an omission in reading in the first embodiment.

Next, the process flow of determination regarding a possibility of an omission in reading by the omission-in-reading determining section 315 will be described with reference to FIG. 15.

As described above, when an identification ID is acquired from an RF tag included in the group A, the omission-in-reading determining section 315 performs time counting according to the acquisition of the identification ID. First, in Act 201, the omission-in-reading determining section 315 determines whether or not the counted time ta is longer than a time $t_{TH}$ which is set as reference for determining whether or not there is a possibility of an omission in reading (determination regarding whether or not ta>$t_{TH}$ is satisfied). If ta>$t_{TH}$ is not satisfied, the omission-in-reading determining section 315 continues the determination regarding the possibility of an omission in reading.

On the other hand, if ta>$t_{TH}$ is satisfied, the omission-in-reading determining section 315 determines that there is a possibility of an omission in reading of an RF tag belonging to the group A (Act 202). Then, in Act 203, the omission-in-reading determining section 315 transmits the determination result to the storage controller 319. The storage controller 319 stores a determination result in the storage section 311 on the basis of the acquisition of the determination result and also updates the table to be read. Specifically, the storage controller 319 updates the omission-in-reading possibility state data from 0 to 1 for an RF tag whose identification ID is not acquired yet (RF tag whose corresponding read state data is 0) in the group A when acquiring the determination result.

Then, in Act 204, the omission-in-reading determining section 315 notifies the determination result presenting section 317 that it was determined that there was a possibility of an omission in reading. The determination result presenting section 317 displays the determination result, which is stored in the storage section 311, on the display section 37 on the basis of the notification in order to notify the user that there is a possibility of an omission in reading. In addition, if the omission-in-reading determining section 315 determines that there is a possibility of an omission in reading, the omission-in-reading determining section 315 stops time counting for the group A (Act 205) and also resets the counted time (Act 206)

In addition, in Act 204, the determination result presenting section 317 notifies the user that there is a possibility of an omission in reading of an RF tag, for example, through a screen shown in FIG. 16 and prompts the user to perform input for making the communication section 312 execute the second communication mode.

Figure 17:
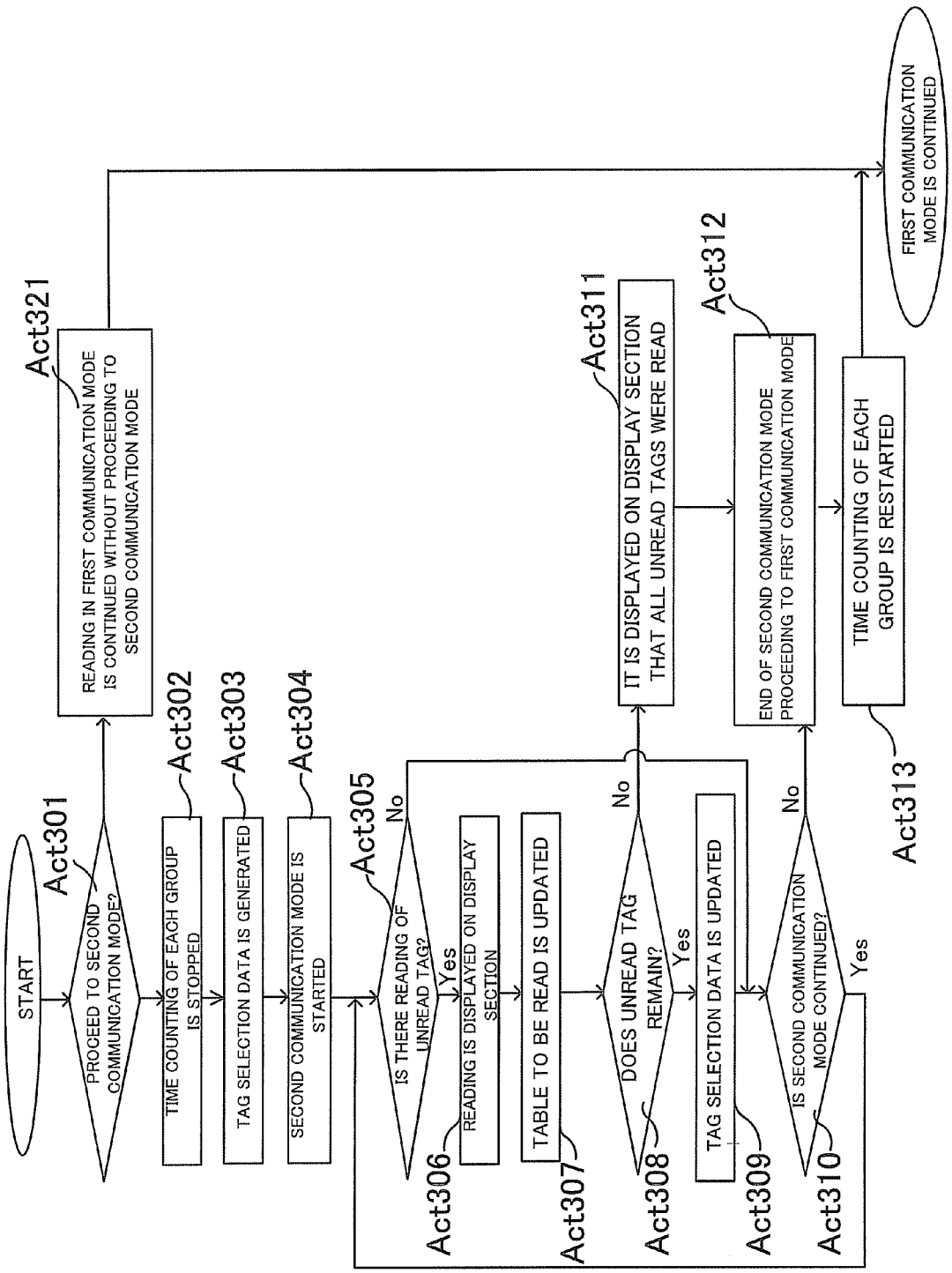
FIG. 17 is a view showing the process flow regarding the acquisition of tag information from an RF tag, which might be unread, in the first embodiment.

Next, the process flow of identification ID acquisition processing only for an RF tag which might be unread in the first embodiment will be described with reference to FIG. 17.

In Act 301, the mode information acquisition section 313 determines whether or not the mode designation information regarding the second communication mode was acquired through the input section 35. If the mode designation information is not acquired for a predetermined time, for example, from the display of the screen shown in FIG. 16 by the determination result presenting section 317 or if there is an input indicating that the second communication mode is not required, the mode information acquisition section 313 notifies the communication section 312 that the mode designation information regarding the second communication mode could not be acquired. In Act 321, the communication section 312 which acquired the notification continues reading in the first communication mode without proceeding to the second communication mode (Act 321).

On the other hand, if the mode designation information regarding the second communication mode is acquired in Act 301, the mode information acquisition section 313 notifies the communication section 312 of the mode designation information. The communication section 312 proceeds to the second communication mode on the basis of the acquisition of the mode designation information.

In Act 302, the communication section 312 notifies the omission-in-reading determining section 315 that the communication section 312 proceeded to the second communication mode. On the basis of this notification, the omission-in-reading determining section 315 also stops time counting for other groups of the group A.

Then, in Act 303, the communication section 312 acquires a table to be read from the storage section 311 through the storage controller 319 and generates the tag selection data for setting an RF tag, which might be unread, as a communication target selectively from identification IDs of RF tags whose corresponding omission-in-reading possibility state data is 1. More specifically, the communication section 312 generates the tag selection data which is set to the Select command in communication of the communication section 312 with an RF tag.

Then, in Act 304, the communication section 312 executes identification ID acquisition processing in the second communication mode in which an RF tag, which might be unread, is selectively set as a communication target using the generated tag selection data.

In Act 305, the communication section 312 determines whether or not an identification ID (which might be unread) was acquired, as a result of the identification ID acquisition processing in the second communication mode. If an identification ID cannot be acquired, the communication section 312 determines whether to continue the identification ID acquisition processing in the second communication mode in Act 310. For example, when there is a user's input for stopping the second communication mode through the input section 35, the determination can be performed on the basis of whether or not this input was transmitted to the communication section 312 by the controller 31. If there is an input for stopping the second communication mode, the communication section 312 proceeds to Act 312, which will be described later, and proceeds from the second communication mode to the first communication mode. On the other hand, if there is no input for stopping the second communication mode, the communication section 312 continues identification ID acquisition processing in the second communication mode.

On the other hand, if it is determined that an identification ID, which might be unread, was acquired in Act 305, the communication section 312 notifies the controller 31 that the identification ID was acquired. On the basis of this notification, the controller 31 displays that the identification ID was acquired on the display section 37 (Act 306)

Then, in Act 307, the communication section 312 transmits the acquired identification ID to the storage controller 319. The storage controller 319 stores the acquired identification ID in the storage section 311 and updates the table to be read on the basis of the acquisition of the identification ID. Specifically, the storage controller 319 updates the omission-in-reading possibility state data corresponding to the acquired identification ID from 1 to 0 and updates the read state data from 0 to 1. Then, the storage controller 319 transmits the updated table to be read to the communication section 312.

Then, on the basis of the acquired updated table to be read, the communication section 312 determines whether or not an RF tag, which might be unread, is still present (Act 308). If it is determined that there is an RF tag, which might be unread, the communication section 312 updates the tag selection data on the basis of the updated table to be read (Act 309). Accordingly, since it is possible to perform communication with an RF tag as a target using a command with higher selectivity, the efficiency of identification ID acquisition processing can be further improved.

Then, in Act 310, the communication section 312 determines whether to continue the second communication mode. If it is determined that the second communication mode is continued, the communication section returns to Act 305 to execute identification ID acquisition processing. On the other hand, if it is determined that the second communication mode is not continued, the communication section 312 ends the second communication mode and proceeds to the first communication mode in Act 312.

In addition, in Act 308, the communication section 312 may determine that there is no tag which might be unread. In this case, the communication section 312 notifies the controller 31 that there is no tag which might be unread. The controller 31 notifies the user, through the display section 37, that there is no RF tag which might be unread, in other words, that an identification ID was acquired from an RF tag which might be unread.

Then, in Act 312, the communication section 312 ends the second communication mode and proceeds to the first communication mode. Then, in Act 313, the communication section 312 notifies the omission-in-reading determining section 315 that the communication section 312 proceeded to the first communication mode. On the basis of this notification, the omission-in-reading determining section 315 executes time counting for determination regarding a possibility of an omission in reading in each group including the group A according to transmission of an identification ID from the communication section 312.

As described above, according to the first embodiment, since a possibility of an omission in reading can be detected, a user can do a work for reading an RF tag which might be unread and the like as necessary. Accordingly, a problem related to omission in reading can be quickly solved. Since this reduces the time required for reading work, the efficiency of the work can be improved. As a result, it is not necessary to repeat reading work while moving around a store several times during inventory work.

(Second Embodiment)

Next, a second embodiment will be described. Sections in common with the first embodiment are denoted by the same reference numerals, and the explanation will be omitted.

In the second embodiment, when identification ID acquisition processing is executed in the second communication mode, the communication section 312 executes identification ID acquisition processing on an RF tag of a group to which an RF tag, whose information is to be acquired and whose omission-in-reading possibility state data is 1, belongs before the identification ID acquisition processing in the second communication mode.

In addition, in the second embodiment, when the communication section 312 proceeds to the second communication mode, the storage controller 319 marks an identification ID acquired last from the omission-in-reading determining section 315, that is, an identification ID acquired last in the first communication mode on the basis of a record (log) stored in the storage section 311.

Then, at the end of the tag information acquisition processing in the second communication mode, the communication section 312 executes identification ID acquisition processing using the identification ID acquired last in the first communication mode which was marked by the storage controller 319.

Figure 18:
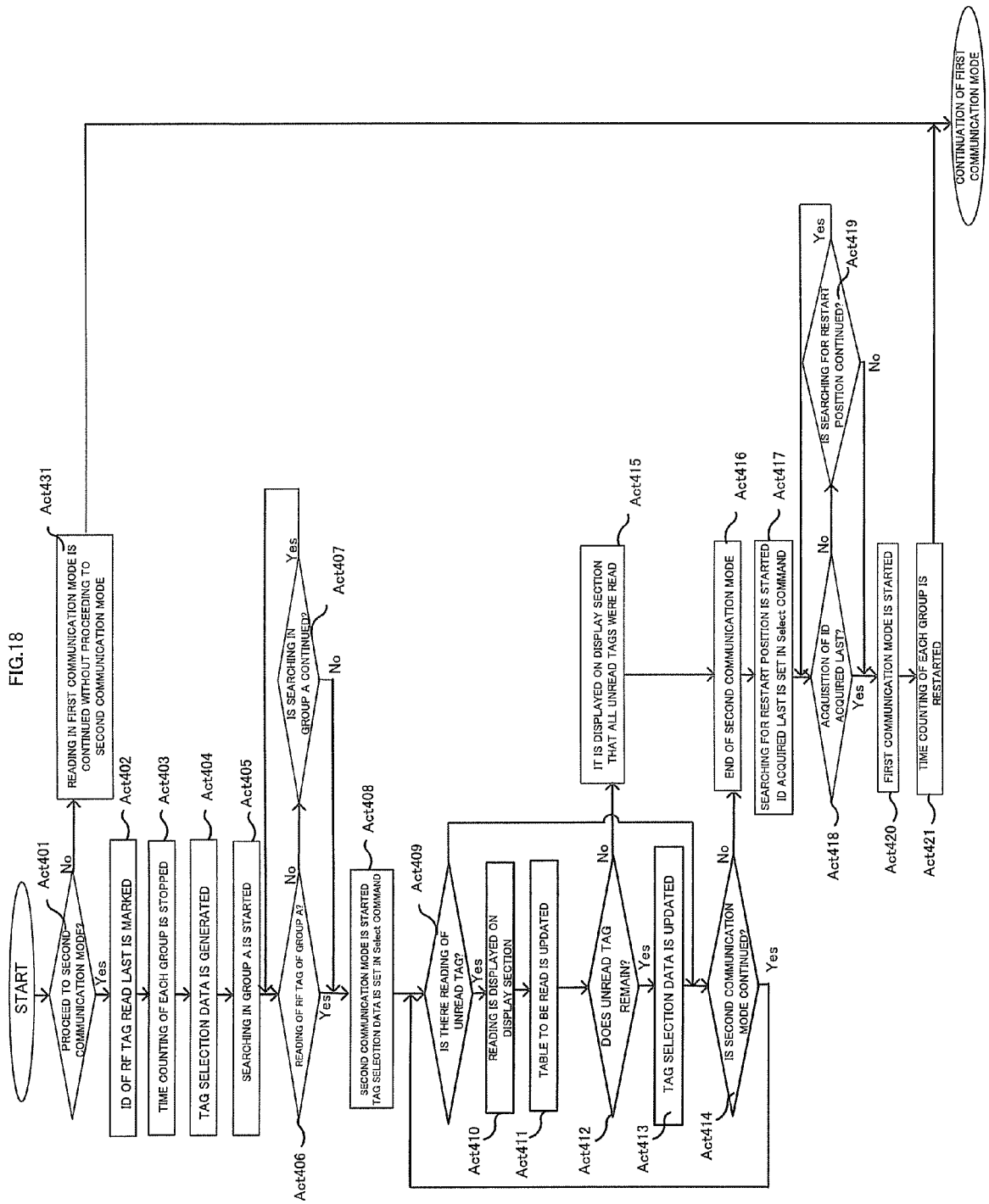
FIG. 18 is a view showing the process flow regarding the acquisition of tag information from an RF tag, which might be unread, in a second embodiment.

Hereinafter, the process flow of identification ID acquisition processing only for an RF tag which might be unread in the second embodiment will be described with reference to FIG. 18. In addition, since Act 401, Act 403, Act 404, Act 408 to Act 415, and Act 431 in FIG. 18 are the same as Act 301 to Act 311 and Act 321 in the first embodiment, the explanation will be omitted. In addition, since the time counting of the omission-in-reading determining section 315 and the process flow of determination regarding a possibility of an omission in reading are also the same, the explanation will be omitted.

In Act 401, first, the mode information acquisition section 313 and the communication section 312 execute the same processing as in Act 301 in the first embodiment. In addition, when proceeding to the second communication mode, the communication section 312 notifies the storage controller 319 that the communication section 312 proceeds to the second communication mode.

Figure 19:
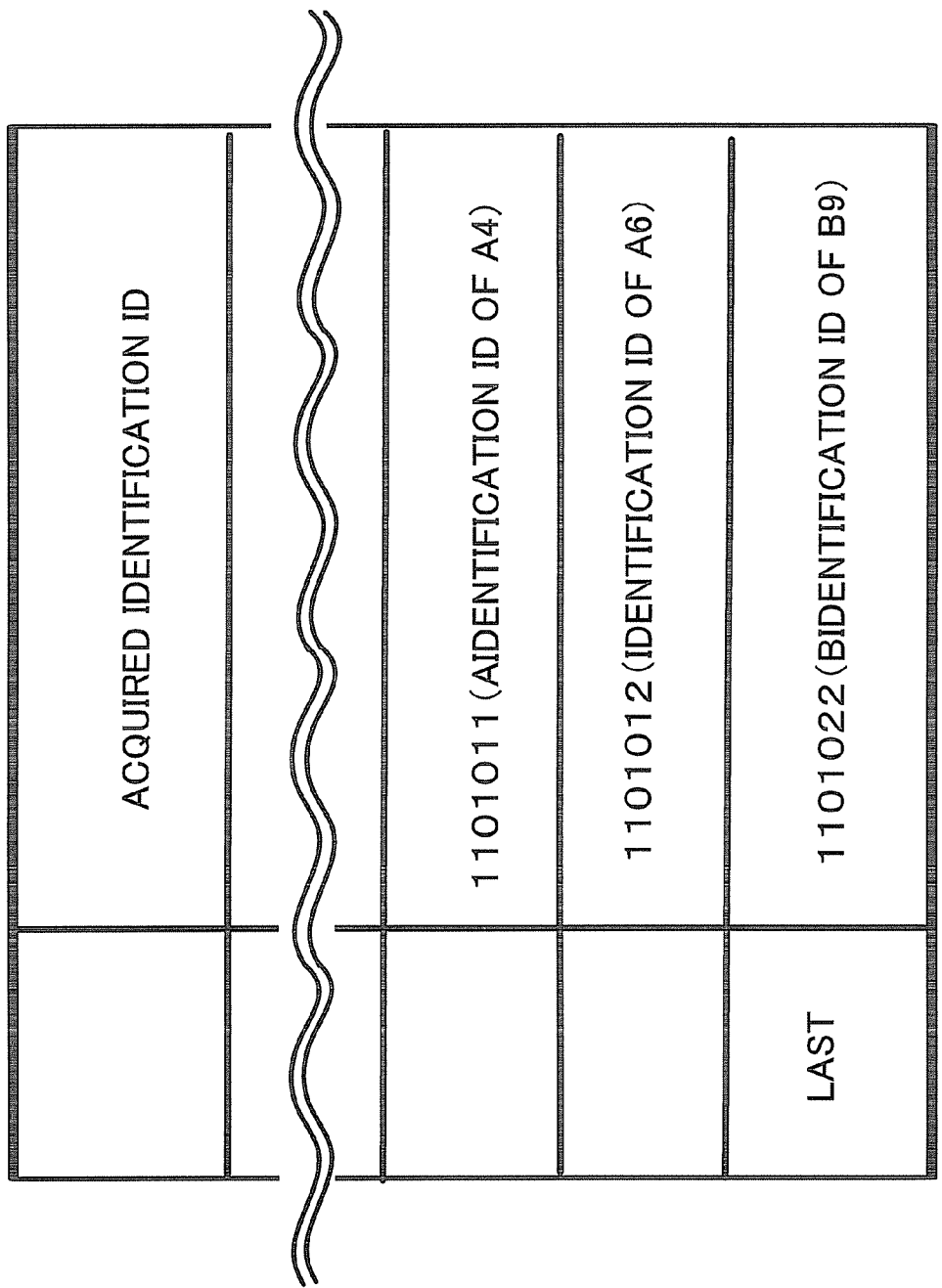
FIG. 19 is a view showing an example of the marking of an identification ID acquired last in a first communication mode in the second embodiment.

In Act 402, when a notification that the communication section 312 proceeds to the second communication mode is received from the communication section 312, the storage controller 319 marks an identification ID acquired last in the first communication mode on the basis of the processing record (log) stored in the storage section 311. For example, when a notification that the communication section 312 proceeds to the second communication mode is acquired after acquiring an identification ID of an RF tag B9 shown in FIG. 6, B9 is marked as shown in FIG. 19.

In Act 405, the communication section 312 executes identification ID acquisition processing on identification IDs of the group A to which an identification ID whose information is to be acquired and which might be unread, more specifically, an identification ID whose information is to be acquired and corresponding omission-in-reading possibility state data is 1 in the table to be read belongs.

In Act 406, the communication section 312 determines whether or not an identification ID of the group A could be acquired. If an identification ID can be acquired, the communication section 312 executes identification ID acquisition processing in the second communication mode (Act 408). If an identification ID of the group A cannot be acquired, the communication section determines whether to continue the processing of acquiring identification IDs of the group A in Act 407. For example, when there is a user's input for stopping the processing of acquiring identification IDs of the group A through the input section 35, the determination can be performed on the basis of whether or not this input was transmitted to the communication section 312 by the controller 31. If there is an input for stopping the processing of acquiring identification IDs of the group A, the communication section 312 proceeds to Act 408 to execute identification ID acquisition processing in the second communication mode. On the other hand, if there is no input for stopping the processing of acquiring identification IDs of the group A, the communication section 312 continues the processing of acquiring identification IDs of the group A.

Then, in Act 416, the communication section 312 ends the identification ID acquisition processing in the second communication mode. Then, in Act 417, the communication section 312 acquires an identification ID acquired last in the first communication mode, which is stored in the storage section 311 after being marked by the storage controller 319, through the storage controller 319. In addition, the communication section 312 sets the identification ID acquired last in the first communication mode in a Select command and performs identification ID acquisition processing on an RF tag which stores the identification ID.

In Act 418, the communication section 312 determines whether or not the identification ID acquired last in the first communication mode was acquired from an RF tag. When the identification ID acquired last in the first communication mode is acquired from an RF tag, the communication section 312 starts the first communication mode (Act 420). Then, in Act 421, the communication section 312 notifies the omission-in-reading determining section 315 that the communication section 312 proceeded to the first communication mode. On the basis of this notification, the omission-in-reading determining section 315 executes time counting for determination regarding a possibility of an omission in reading in each group including the group A according to transmission of an identification ID from the communication section 312.

On the other hand, if the identification ID acquired last in the first communication mode cannot be acquired from an RF tag, it is determined whether to continue the processing of acquiring the identification ID acquired last in the first communication mode in Act 419. For example, when there is a user's input for stopping the processing of acquiring the identification ID acquired last in the first communication mode through the input section 35, the determination can be performed on the basis of whether or not this input was transmitted to the communication section 312 by the controller 31. If there is an input for stopping the processing of acquiring the identification ID acquired last in the first communication mode, the communication section 312 proceeds to Act 420 to execute identification ID acquisition processing in the first communication mode. On the other hand, if there is no input for stopping the processing of acquiring the identification ID acquired last in the first communication mode, the communication section 312 returns to Act 418 to continue the processing.

As described above, according to the second embodiment, it is possible to quickly specify the location of an RF tag which might be unread. In addition, when the second communication mode ends, it is possible to more quickly specify the position at which an antenna was present before the second communication mode is performed. Therefore, according to the second embodiment, reading work can be done more quickly.

While the first and second embodiments were described, the invention is not limited thereto, and various changes and modifications may also be made.

For example, in the first embodiment, mark information indicating that there is a possibility of an omission in reading may be matched to the identification information by updating the omission-in-reading possibility state data, which corresponds to an identification ID (example of the identification information) of an RF tag which might be unread, to 1. However, the invention is not limited to the above method, and the mark information may be matched to the identification information in other methods.

Figure 20:
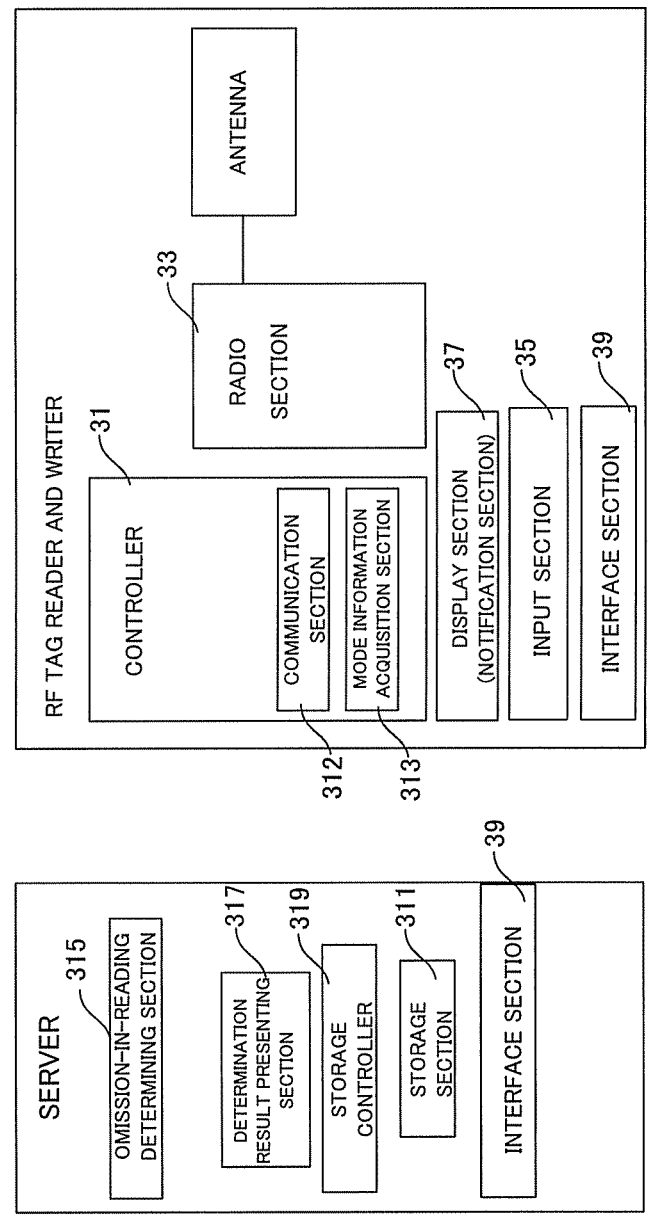
FIG. 20 is a functional block diagram regarding determination of a possibility of an omission in reading in another embodiment.
Figure 21:
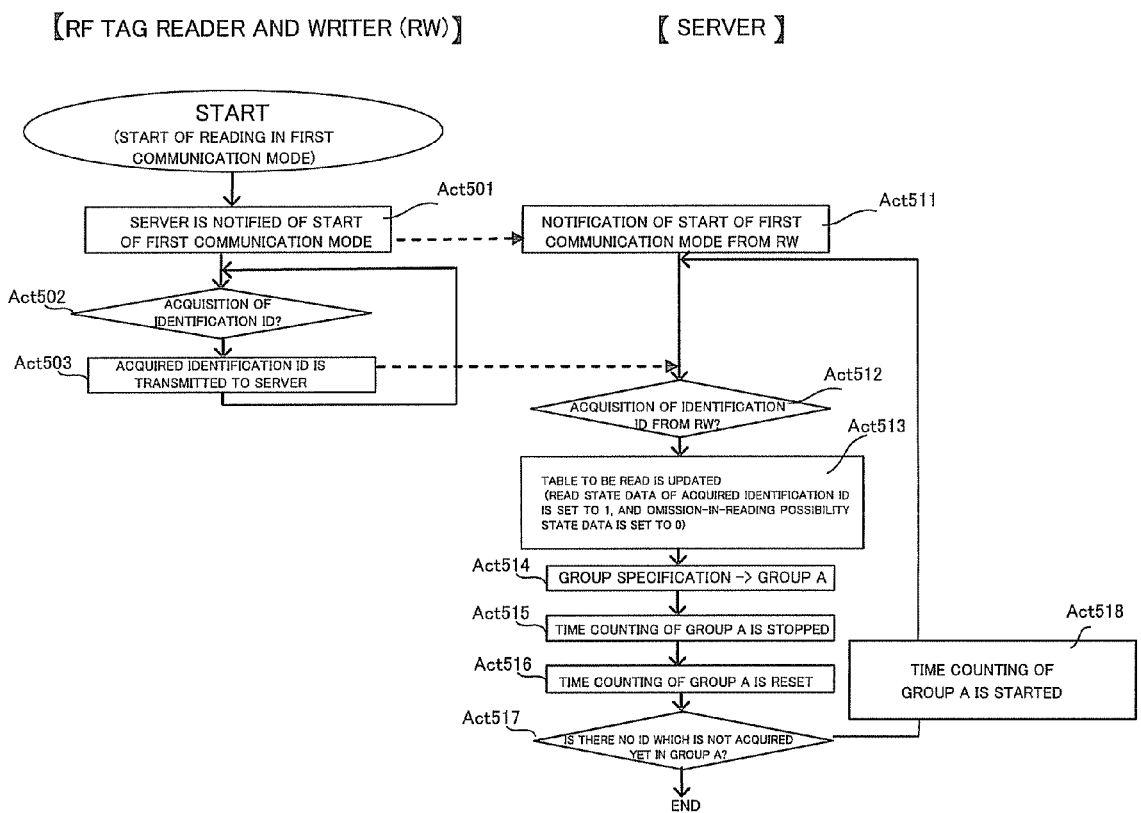
FIG. 21 is a view showing the process flow regarding determination of a possibility of an omission in reading in another embodiment.
Figure 22:
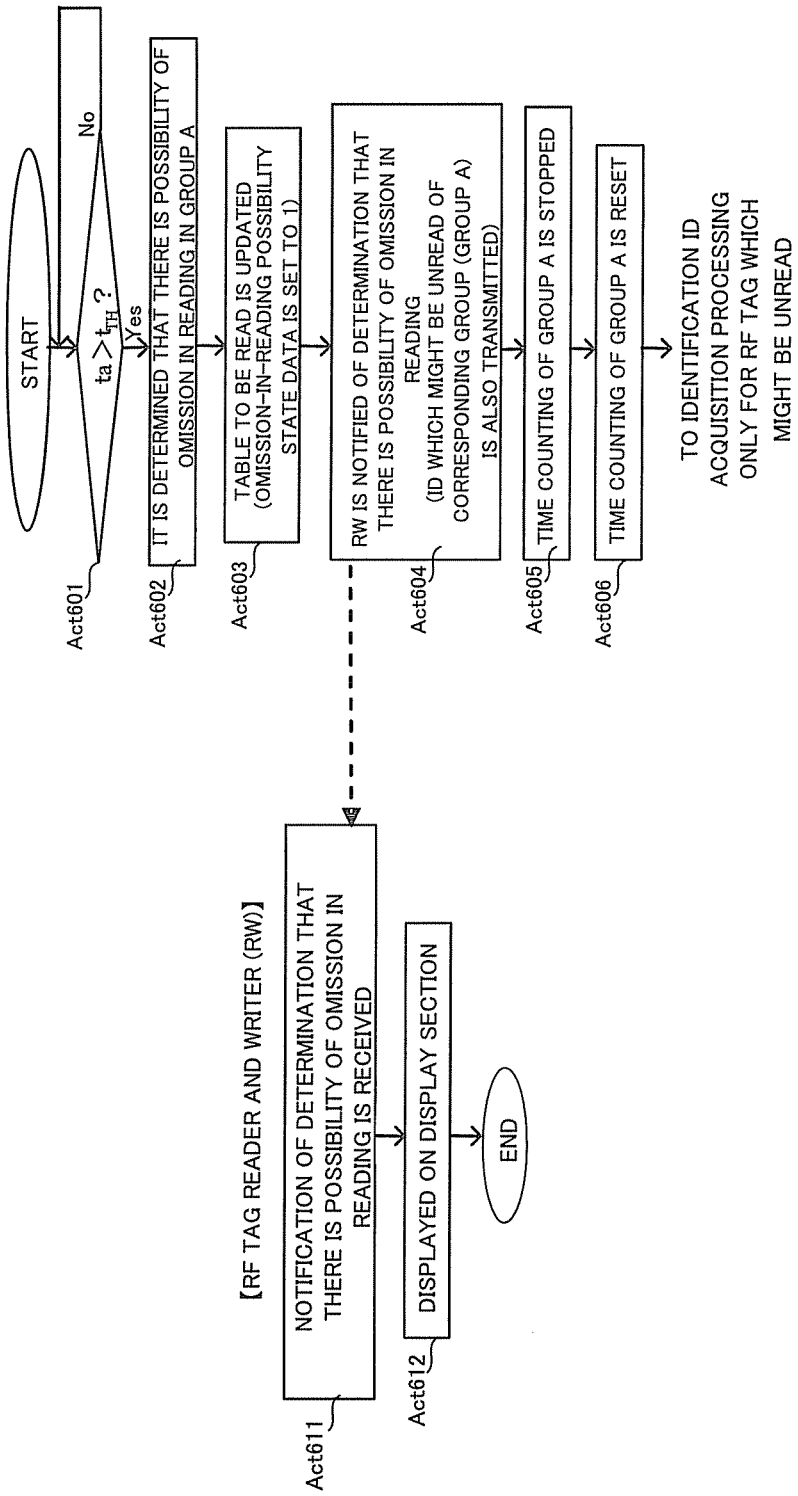
FIG. 22 is a view showing the process flow regarding the acquisition of tag information from an RF tag, which might be unread, in another embodiment.

In addition, although the configuration where the processing of determining a possibility of an omission in reading is performed in the reader and writer is adopted in the first and second embodiments, the invention is not limited to this and the determination processing may also be executed in a device separated from the reader and writer, for example, in a server. In other words, the RF tag reader may be formed by a plurality of separate devices. A functional block diagram and the process flow in this case are illustrated in FIGS. 20 to 22. In addition, identification IDs may be stored in a server or the like together with not only the read state data or the omission-in-reading possibility state data but also the information regarding products shown in FIG. 23.

In addition, in the second embodiment, both the identification ID acquisition processing on a group including an RF tag which might be unread before the second communication mode and the acquisition processing on an identification ID acquired last in the first communication mode are executed. However, needless to say, only one of the acquisition processings may be executed.

Moreover, in the first embodiment, the case where an RF tag which might be unread was present only in the group A was mentioned as an example for easy understanding. However, RF tags which might be unread may be present in a plurality of groups. In this case, it is also possible to generate the tag selection data between RF tags belonging to different groups.

When generating the tag selection data between RF tags belonging to different groups, the tag selection data may be generated between RF tags of groups which are associated with each other in advance, for example, based on the rule of associating products placed adjacent to each other in a preferential order.

Figure 24:
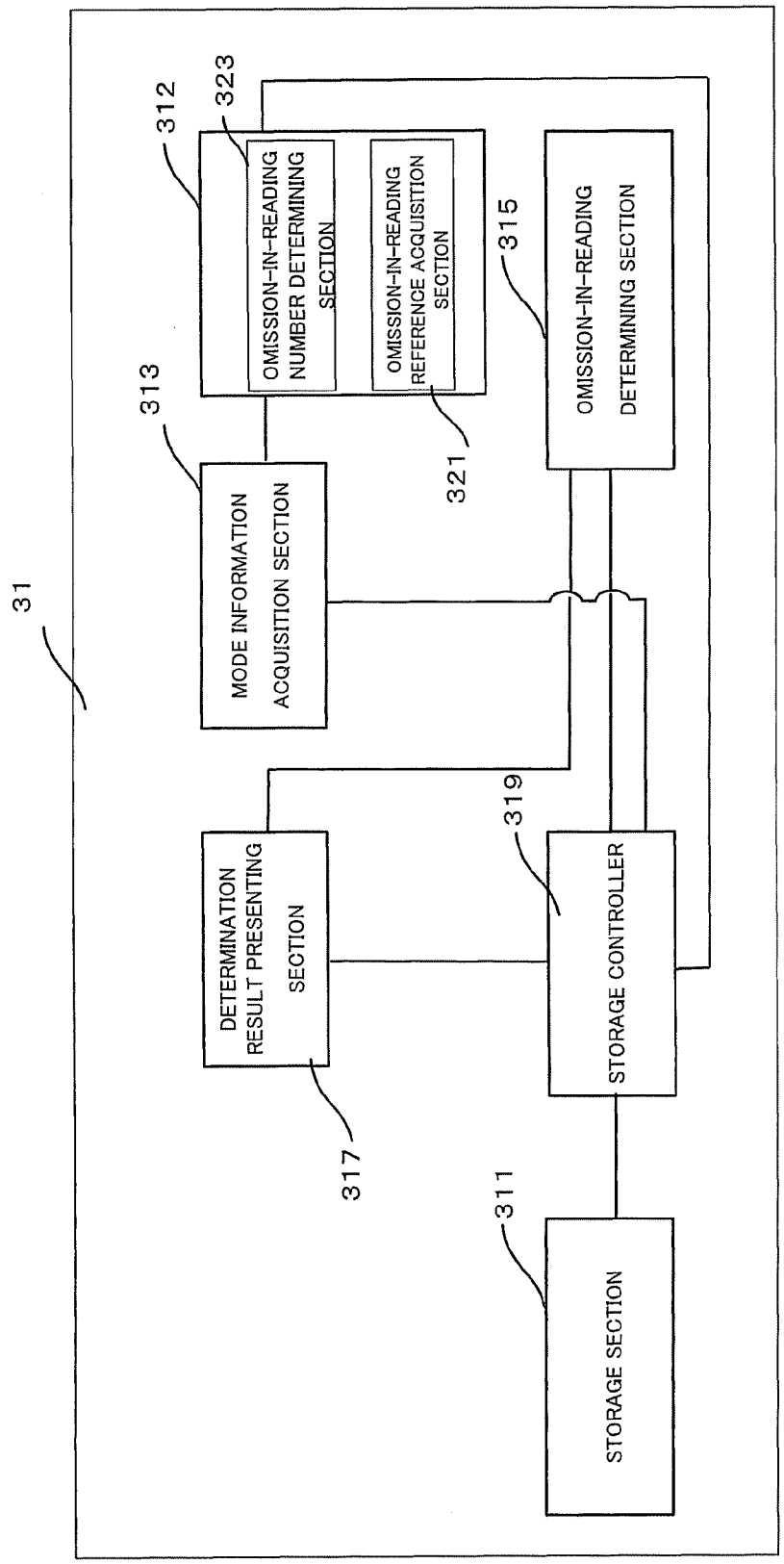
FIG. 24 is a functional block diagram regarding determination of a possibility of an omission in reading in another embodiment.

In addition, the tag selection data may also be selected in one group. Alternatively, when the number of RF tags which might be unread in one group is smaller than a predetermined number, the tag selection data may be selected between the RF tags and RF tags, which might be unread, belonging to other groups associated with the group in advance. That is, as shown in FIG. 24, as one aspect, an omission-in-reading reference acquisition section 321 which acquires the information (for example, stored in the storage section 311)

regarding the omission-in-reading reference, which is a reference for the number of RF tags whose tag information might be unread, and an omission-in-reading number determining section 323 which determines whether or not the number of RF tags (for example, the number of RF tags whose omission-in-reading possibility state data is 1), in which the identification information is matched to the mark information, in one group is smaller than the omission-in-reading reference using the information regarding the omission-in-reading reference acquired by the omission-in-reading reference acquisition section may be further provided in addition to the configuration described in the first or second embodiment. Moreover, if the omission-in-reading number determining section determines that the number of RF tags, in which the identification information is matched to the mark information, is smaller than the omission-in-reading reference, the communication section executes the information acquisition processing on the RF tags, in which the identification information is matched to the mark information, and RF tags, which belong to another group associated with the one group and are determined that the tag information might be unread.

In addition, a program causing a computer, which forms the RF tag reader and writer, to execute the various operations described above may be provided as a tag information acquisition program. Although the case where the program for realizing a function of executing the invention is recorded in advance in the storage section 311 provided inside the reader and writer is illustrated in the first to second embodiments, the invention is not limited to this. For example, the same program may be downloaded to an apparatus through a network, or the same program which is stored in a computer-readable recording medium may be installed in an apparatus. As recording media, any kinds of recording media may be used as long as the recording media can store a program and can be read by a computer. Specifically, examples of the recording media include: internal storage devices mounted inside a computer, such as a ROM and a RAM; portable storage media, such as a CD-ROM, a flexible disk, a DVD disk, a magneto-optical disk, and an IC card; a database which stores a computer program; other computers and their databases; and a transmission medium on the line. In addition, the function obtained in advance by installation or download as described above may be realized in cooperation with an OS (operating system) or the like inside an apparatus.

In addition, the program in the present embodiment is assumed to include a program which generates execution modules dynamically.

While certain embodiments have been described, these embodiments have been presented by way of example only, and are not intended to limit the scope of invention. Indeed, the novel method described herein may be embodied in a variety of other forms; furthermore, various omissions, substitutions and changes in the form of the apparatus and method described herein may be made without departing from the spirit of the inventions. The accompanying claims and their equivalents are intended to cover such forms or modifications as would fall within the scope and spirit of the inventions.

As described in detail above, according to the technique described in this specification, it is possible to detect quickly that information acquisition failed in a communication with an RF tag.

What is claimed is:

1. An RF tag reader comprising:
a communication section having a first communication mode in which processing of acquiring identification ID of an RF tag, is executed for an RE tag whose identification ID is not acquired yet in a predetermined group;
an omission-in-reading determining section determining that an RF tag belonging to the group might be unread when identification ID is not acquired by the communication section from the RF tag, within a predetermined time after identification ID of any one of other RF tags belonging to the group is acquired;
a marking section matching identification information, which is stored in advance in a predetermined storage region and corresponds to the RF tag that might be unread, to mark information, which indicates that there is a possibility of an omission in reading, when the omission-in-reading determining section determines that there is a possibility of an omission in reading;
a common information generator generating tag selection data used for performing selective communication with an RF tag, in which the identification information is matched to the mark information, on the basis of the identification information of the RE tag, in response to a user's request;
an omission-in-reading reference acquisition section which acquires an information regarding an omission-in-reading reference, which is a reference for the number of RF tags whose identification ID might be unread;
an omission-in-reading number determining section which determines whether or not the number of RF tags in which the identification ID is matched to the mark information, in one group is smaller than the omission-in-reading reference using the information regarding the omission-in-reading reference acquired by the omission-in-reading reference acquisition section;
wherein communication section further has a second communication mode in which identification ID acquisition processing is selectively executed for an RF tag which belongs to the one group and in which the identification ID is matched to the mark information, and an RF tag which belongs to another group associated with the one group and in which the identification ID is matched to the mark information, using the tag selection data, if the omission-in-reading number determining section determines that the number of RF tags in which the identification ID is matched to the mark information, in the one group is smaller than the omission-in-reading reference; and
wherein the RF tag reader further comprises a last acquisition marking section which marks an identification ID acquired last in the first communication mode before the second communication mode is executed, wherein the communication section acquires an identification ID as tag information of an RF tag.

2. The reader according to claim 1,
wherein when the communication section executes the tag information acquisition processing in the second communication mode using the tag selection data, the omission-in-reading determining section does not perform determination processing regarding a possibility of an omission in reading for an RF tag whose tag information is to be acquired in the second communication mode.

3. The reader according to claim 1,
wherein when executing tag information acquisition processing in the second communication mode, the communication section executes information acquisition processing on an RF tag of a group, to which an RF tag whose information is to be acquired belongs, before executing the tag information acquisition processing in the second communication mode.

4. An RF tag information acquisition method comprising:
executing tag information acquisition processing in a first communication mode in which processing of acquiring identification ID of an RF tag, is executed for an RF tag whose identification ID is not acquired yet in a predetermined group;
marking an identification ID acquired last in the first communication mode;
determining that an RF tag belonging to the group might be unread when identification ID is not acquired from the RE tag, within a predetermined time after identification ID of any one of other RF tags belonging to the group is acquired;
matching identification information, which is stored in advance in a predetermined storage region and corresponds to the RF tag that might be unread, to mark information, which indicates that there is a possibility of an omission in reading, when it is determined that there is a possibility of an omission in reading;
generating tag selection data used for performing selective communication with the RF tag, in which the identification information is matched to the mark information, on the basis of the identification information of the RF tag, in response to a user's request;
acquiring an information regarding an omission-in-reading reference, which is a reference for the number of RF tags whose identification ID might be unread;
determining whether or not the number of RF tags in which the identification ID is matched to the mark information, in one group is smaller than the omission-in-reading reference using the information regarding the omission-in-reading reference;
executing tag information acquisition processing in a second communication mode in which identification ID acquisition processing is selectively executed for an RF tag which belongs to the one group and in which the identification ID is matched to the mark information, and an RF tag which belongs to another group associated with the one group and in which the identification ID is matched to the mark information, using the tag selection data, if it is determined that the number of RF tags in which the identification ID is matched to the mark information, in the one group is smaller than the omission-in-reading reference; and
acquiring an identification ID as tag information of an RF tag by using the marked identification ID after the end of the second communication mode.

5. The method according to claim 4,
wherein when executing the tag information acquisition processing in the second communication mode using the tag selection data, determination processing regarding a possibility of an omission in reading is not performed for an RF tag whose tag information is to be acquired in the second communication mode.

6. The method according to claim 4,
wherein when executing tag information acquisition processing in the second communication mode, information acquisition processing on an RF tag of a group, to which an RF tag whose information is to be acquired belongs, is executed before executing the tag information acquisition processing in the second communication mode.

7. An RF tag reader comprising:
a communication section having a first communication mode in which processing of acquiring RF tag information of an RF tag is executed in a predetermined group;
an omission-in-reading determining section which determines that the RF tag belonging to the predetermined group might be unread when the tag information is not acquired from the RF tag, within a predetermined time after the tag information corresponding to any one of a plurality of the RF tags grouped as the predetermined group is acquired,
an omission-in-reading reference acquisition section which acquires an information regarding an omission-in-reading reference, which is a reference for the number of RF tags whose RF tag information might be unread; and
an omission-in-reading number determining section which determines whether or not the number of RF tags in which the RF tag information is matched to a mark information indicating that there is a possibility of an omission in reading, in one group is smaller than the omission-in-reading reference using the information regarding the omission-in-reading reference acquired by the omission-in-reading reference acquisition section,
wherein the mark information is matched to the RF tag information, which is stored in advance in a predetermined storage region and corresponds to the RF tag that might be unread, when the omission-in-reading determining section determines that there is a possibility of an omission in reading,
wherein the communication section further has a second communication mode in which processing of acquiring the RF tag information of the RF tag is selectively executed for an RF tag which belongs to the one group and in which the RF tag information is matched to the mark information, and an RF tag which belongs to another group associated with the one group and in which the RF tag information is matched to the mark information, using a tag selection data, if the omission-in-reading number determining section determines that the number of RF tags in which the RF tag information is matched to the mark information, in the one group is smaller than the omission-in-reading reference, and
wherein the tag selection data is used for performing selective communication with an RF tag, in which the RF tag information is matched to the mark information, on the basis of the RF tag information of the RF tag, in response to a user's request.

8. The reader according to claim 7, further comprising
a marking section which matches the RE tag information, to the mark-information.

9. The reader according to claim 7,
wherein when the communication section executes the tag information acquisition processing in the second communication mode, the omission-in-reading determining section does not execute determination processing regarding a possibility of an omission-in-reading.

10. The reader according to claim 7, wherein before executing the RF tag information acquisition processing in the second communication mode, the communication section executes information acquisition processing on an RF tag in the predetermined group including the RF tag which is regarded as an omission-in-reading.

11. The reader according to claim 7, further comprising
a last acquisition marking section which marks an RF tag information which is acquired last in the first communication mode before the second communication mode is executed,
wherein the communication section acquires the RF tag information marked by the last acquisition marking section after acquisition of the RF tag information in the second communication mode is completed.

* * * * *